US006530007B2

(12) United States Patent
Olarig et al.

(10) Patent No.: US 6,530,007 B2
(45) **Date of Patent: *Mar. 4, 2003**

(54) METHOD AND APPARATUS FOR SUPPORTING HETEROGENEOUS MEMORY IN COMPUTER SYSTEMS

(75) Inventors: Sompong Paul Olarig, Cypress, TX (US); David J. Koenen, Houston, TX (US); Chai S. Heng, Cypress, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 09/902,824

(22) Filed: Jul. 10, 2001

(65) Prior Publication Data

US 2002/0002662 A1 Jan. 3, 2002

Related U.S. Application Data

(63) Continuation of application No. 09/114,426, filed on Jul. 13, 1998, now Pat. No. 6,260,127.

(51) Int. Cl.[7] ........................................ G06F 13/00
(52) U.S. Cl. ........................ 711/167; 711/5; 711/170
(58) Field of Search ........................ 711/5, 104, 105, 711/167, 170

(56) References Cited

U.S. PATENT DOCUMENTS 6,047,361 A 4/2000 Ingenio et al.

OTHER PUBLICATIONS

*Concurrent Support of FPM, EDO and Synchronous DRAMs*, IBM MicroNews, 2$^{nd}$ Q. 1997, pp. 26–29.

(List continued on next page.)

*Primary Examiner*—Kevin L. Ellis
(74) *Attorney, Agent, or Firm*—Akin Gump Strauss Hauer & Feld LLP

(57) ABSTRACT

A memory controller capable of supporting heterogeneous memory configurations enables seamless communications between a bus and memory modules having different characteristics. Thus, owners of computer systems need no longer replace entire memory arrays to take advantage of new memory modules; some memory modules may be upgraded to a new type while other memory modules of an older type remain. The memory controller receives memory requests from multiple processors and bus masters, identifies a memory module and memory access parameters for each request, accesses the memory and returns the resulting data (during a read request) or stores the data (during a write request). In some systems, the memory controller of the present invention is a two-tier memory controller system having a first memory controller coupled to the bus and to the second tier of memory controllers or RAM personality modules that translate between the first memory controller and a particular type of memory module. Typically, between the tiers a protocol is used which is representative of a typical clocked synchronous dynamic random access memory (SDRAM), although another protocol could be used. From the perspective of the processor bus or host bus coupled to the front end of the first memory controller, the entire memory controller system behaves as a single memory controller. From the perspective of memory, the back end of the RAM personality module is seen as a memory controller designed specifically to be configured for that memory type. Consequently, although the front end of the RAM personality module can be standardized across the system, compatible with the back end of the first memory controller, and in most embodiments of the present invention, the back end of the RAM personality module differs among the controller modules in the second tier, according to the variety of the memory modules in the memory system.

7 Claims, 9 Drawing Sheets

OTHER PUBLICATIONS

*The 12C–bus and how to use it*, Philips Semiconductors, © 1991, 92, 93, pp. 46–83.

*IBM Preliminary, 64Mb Synchronous DRAM*, IBM Corporation, Mar. 1997, pp. 1–58.

*Compaq 8–Way Multiprocessing Architecture*, Compaq Computer Corporation, Nov. 1997, pp. 1–14.

*8–Way Technology and the Compaq ProLiant 7000*, Compaq Computer Corporation, Oct. 1997, pp. 1–6.

*SL–DRAM Protocol and Command Format*, Mosaid Technologies, Inc., Dec. 11, 1996 (21 pp.).

*Memory Products Selection Guide*, NEC Electronics Inc., Oct. 1996 (12–page brochure).

*SDRAM detour defined for PC's Rambus Route*, EE Times, Issue 993, Feb. 16, 1998, pp. 1 and 4.

*NEC MOS Integrated Circuit μPD4516421, 4516821, 4516161*, NEC Electronics Inc., Nov. 1995 (103–page booklet).

*A Full Palette of Memory Solutions*, NEC Electronics Inc., © 1996 (small brochure).

*Making Your Graphics Vision a Reality*, NEC Electronics Inc., © 1996 (small brochure).

*Application Note 168 Pin DIMM Characteristics*, IBM Corporation, p. 1367.

METHOD AND APPARATUS FOR SUPPORTING HETEROGENEOUS MEMORY IN COMPUTER SYSTEMS

CROSS-REFERENCE TO RELATED APPLICATIONS

This application is a continuation of application Ser. No. 09/114,426, filed Jul. 13, 1998 now U.S. Pat. No. 6,260,127, which is incorporated in its entirety for reference.

BACKGROUND OF THE INVENTION

1. Field of the Invention

The present invention relates to memories and memory controllers, and more specifically to computer systems having multiple memories and a memory controller.

2. Description of the Related Art

In most computer systems, microprocessors operate at a much higher speed than the related memory. Ever since the first AT-compatible computers were introduced with 80286 microprocessors, wait states have been added when the microprocessor requests information from memory. More recently, however, various methods such as page mode and static column techniques have increased memory speed substantially. Interleaving of memory, in which total RAM is divided into various banks, storing sequential bits in alternate banks, and using high-speed memory cache have also increased memory access speed.

Dynamic random access memory (DRAM) is typically organized in rows and columns, which can also help increase memory speed when the row length is such that repeated accesses are more often on the same row than between different rows. Typical DRAM configurations include 256×8, 1M×32, 2M×32, 4M×32, 1M×36, 2M×36, 4M×36, 8M×36, 1M×40, 1M×16, 256K×16, 512K×8, etc. Other options, such as whether the memory is a SIMM or DIMM, whether fast page mode is available, and what the various access times are, are all subject to selection by the board configuration engineer. By determining the number of rows and columns of organization, by the byte density, by pin count, by packaging type, access time, operating current, and the number of chips in the package, and other considerations, a board configuration engineer can select an appropriate DRAM structure for a particular system's needs.

Given the large number of options, new systems often render previous systems obsolete. Depending on the cost of the consequent upgrade requirements, an end user, customer, or consumer must decide whether to completely replace an existing system, whether to struggle along as long as possible with the existing system, or whether to attempt a partial upgrade, in which some components may be replaced with newer components. The latter alternative, which may be considered a temporary stopgap measure postponing the inevitable cost of an upgrade, however, is not typically possible. The end user is often forced either to replace the system entirely, or to struggle along with an existing system. Given the rapid development of computer systems, the consumer is therefore often left with an expensive, inevitable, and frequently recurring upgrade need.

While this can be expensive for consumers, the cost can be devastating to small, medium, and large businesses, which often have a local network of desktop computers with one or more servers. The servers can often have tens of thousands of dollars worth of memory components. Replacing all the memory in a server, therefore, can be an enormous expense. Because development in memory speeds is often revolutionary rather than evolutionary, a small business is frequently faced with the dilemma of whether to completely upgrade the system, including the server connected to the local network, or whether to struggle along with the present system.

Unfortunately, the small business has typically not been able to upgrade in small steps, since products are often configured with only a single memory type. Given the large memory requirements of most servers and other large computer systems, even a small difference in memory price between memory components, when multiplied by the large memory needs of a typical computer system, can translate into an enormous investment. Because a memory controller, regardless of whether the memory controller contains a cache, can typically only communicate with a single type of memory, the owner of the large computer system has typically been required to select a single memory speed, configuration, and other constraints.

Moreover, most computers have used a single memory module size throughout the memory array, to facilitate interleaving. Memory modules are typically slower than the processors to which they are coupled. For this reason, many computer systems require wait states during a memory access. Although the use of wait states slows a computer down, the processor always has the correct value of data. To reduce the need for wait states, interleaving of memory has often been used. Interleaving is a method of writing adjacent memory locations to different memory banks. For example, one bank may hold the odd memory locations and another bank may hold the even memory locations. When sequential memory locations are addressed, one bank can provide data access while the other is free to complete its precharge from the previous access to minimize the memory latency. However, to be fully effective, the banks should be of equal size. Using different memory bank sizes is problematic when high numbers of memory locations are addressed.

BRIEF SUMMARY OF THE INVENTION

Briefly, the present invention describes, in one embodiment, a memory controller capable of supporting heterogeneous memory configurations. Several different memory module types are coupled to a bus via the memory controller of the present invention, and communications occur seamlessly with the bus. The memory controller receives memory requests from one or more processors or other bus masters via the bus. The memory controller receives the memory request, identifies a memory, and also memory access parameters, and accesses the memory and returns the resulting data (during a read request) or stores the data (during a write request). When the memory provides the data (on a read request), to the memory controller, the memory controller provides the resulting data to the bus, where it can be read by the processor.

In some systems, the memory controller of the present invention is a two-tier memory controller system having a first memory controller coupled to the bus and to the second tier of memory controllers. Each of the memory controllers in the second tier is coupled to the first memory controller and to a single type of memory module. The first memory controller receives access requests from the bus. The first memory controller identifies a second memory controller within the second tier. If desired, memory striping may be used, to balance memory use and to prevent clumping of memory accesses within a single bank or memory module. Thus, the various memory controllers in the second tier are used approximately equally, in some embodiments, at a frequency roughly equivalent to the percentage of memory they can access. A RAM personality module (RPM), or memory controller in the second tier, is clocked by the same clock received by the first memory controller in the memory controller system. Thus, the RAM personality module can communicate data to the first memory controller according to a protocol understandable by the first memory controller. Typically, this protocol is a protocol representative of a typical clocked synchronous dynamic random access memory (SDRAM), although another protocol could be used. From the perspective of the processor bus or host bus coupled to the front end of the first memory controller, the entire memory controller system behaves as a single memory controller. From the perspective of memory, the back end of the RAM personality module is seen as a memory controller designed specifically to be configured for that memory type.

Consequently, the front end of the RAM personality module can typically be standardized across the system, compatible with the back end of the first memory controller. However, in most embodiments of the present invention, the back end of the RAM personality module differs among the controller modules in the second tier, according to the variety of the memory modules in the memory system.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

Computer systems typically have a number of devices coupled to a system bus or motherboard, including at least one microprocessor, at least one bus, a system memory, an input device such as a keyboard controller and an output device such as video monitor display controller. Often, however, computer systems are expanded by adding other devices such as peripheral disk drives, printers, a cache memory, modem connections, other IDEs, audio speakers, and a wide array of other options. Adding still more devices to a computer system can be accomplished via expansion buses, such buses that conform to PCI, ISA, EISA, microchannel, and other bus standards. The buses have slots for receiving expansion cards that can be inserted into the slots. Expansion cards, like the embedded cards on the motherboard, are inserted into either the motherboard or an expansion bus where the cards are accessible to other devices in the system. Most expansion devices are generally purchased connected via a cable or wire to a small card that comes with one or more devices. To use the device, someone inserts the card into one of the slots in one of the buses in the computer system, restarts (or reboots) the system, and the device is now available.

A Typical Computer System

Figure 1:
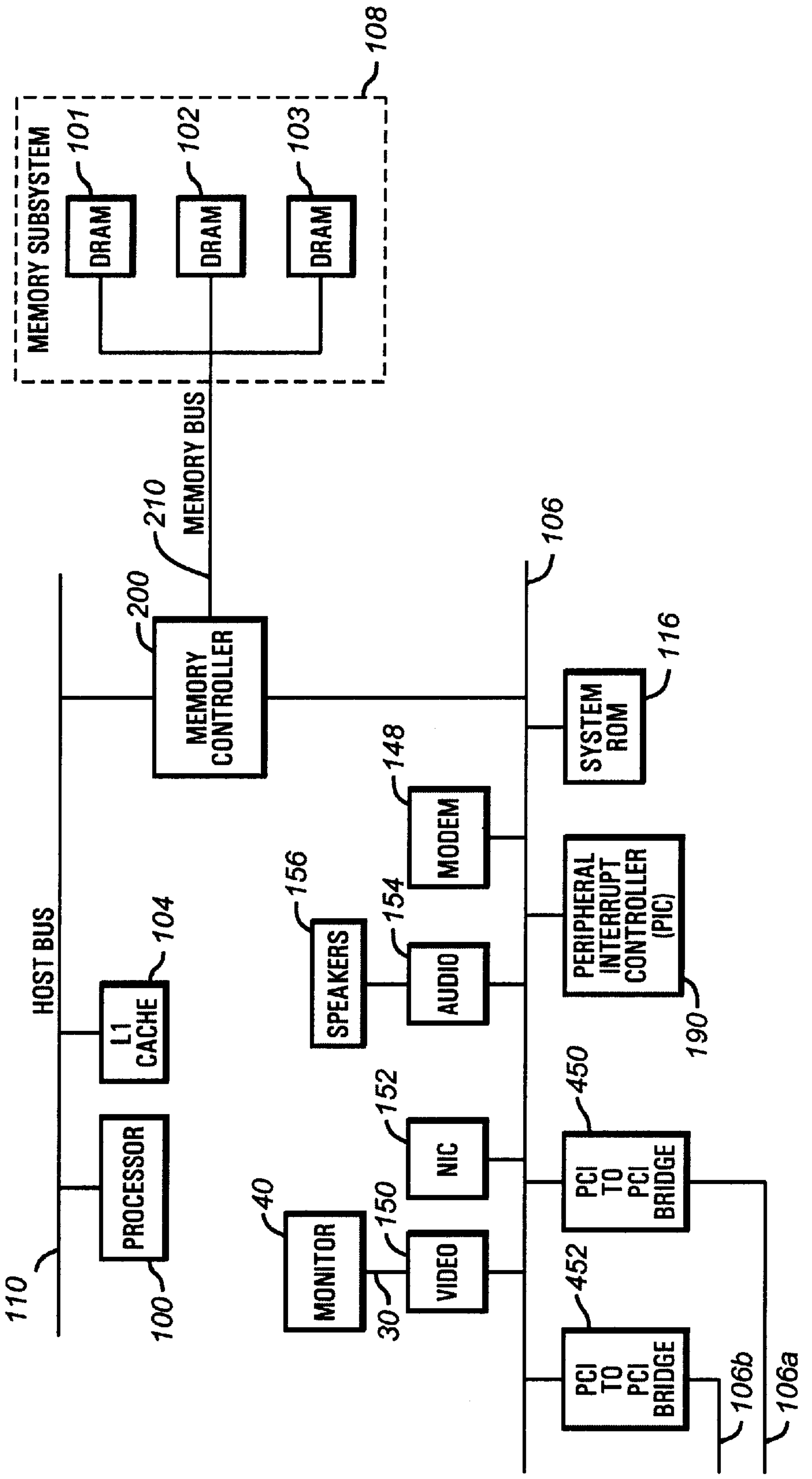
FIG. 1 is a schematic diagram showing a typical computer system having a memory controller.

As shown in FIG. 1, a central processing unit 100 is coupled to a host bus 110. The central processing unit 100 may be a single microprocessor, such an Intel Corporation's 486 or Pentium, PentiumPro, Pentium II, or a more complete processor system including multiple microprocessors, a cache controller, external co-processors, and other components, coupled to one another or to the host bus 110. The host bus 110 functions to interface the central processing unit 100 to the rest of the computer system C. The host bus 110 typically is located on a motherboard, but may be configured as any of a number of other subsystems, as known in the art.

Also coupled to the host bus 110 is a cache 104. The cache may be a write through, a write back, or multi-level cache system for storing commonly used or recently used data values. The cache generally consists of a high-speed static RAM structure, addressable within the memory space of the processor's address lines.

Also coupled to the host bus 110 is a memory controller 200, described below in more detail with reference to FIG. 2. The memory controller 200 provides interconnection between the host bus 110, a memory bus 210, and in some systems (if desired) a first PCI bus 106. A main memory 108, typically comprising multiple memory modules 101, a dynamic RAM 102, and other multiple memory modules 103 is coupled to the memory bus 210. The main memory 108 provides relatively high-speed data storage for instructions and data needed for the processor to perform its functions.

A system ROM 116, on the primary PCI bus 106, typically includes the system firmware, including the BIOS and password, that are installed automatically when power is applied to the system. The system ROM 116 is typically a flash ROM device. The firmware may be run statically from the system ROM, or may be shadowed into system RAM and run dynamically from the RAM. In many computer systems, the hardware configures itself according to the instructions in the BIOS upon power up.

Also coupled to the host bus 110, via a bridge that preferably includes the memory controller 200, is the primary PCI bus 106. The PCI bus 106 is coupled to a plurality of additional devices, including a video card 150, a network interface controller 152, an audio device or audio card 154, a fax modem 148, and PCI-to-PCI bridges 450 and 452. The video card 150 typically includes a graphics processor and a video graphics adapter, and is coupled to a monitor 40 via a coaxial cable 30 or other computer connector. The audio device or audio card 154 generally is coupled to audio speakers 156 or other audio output device to provide an audio output.

A second PCI bus 106*a* is coupled via PCI-to-PCI bridge 450 to the first PCI bus 106, providing an extension for additional peripheral components. Also, a third PCI bus 106*b* is coupled via PCI-to-PCI bridge 450 to the first PCI bus 106, providing an extension for additional peripheral components. The PCI buses 106, 106*a*, and 106*b* may alternately be replaced with an X-bus or an ISA bus, or as an EISA bus, a microchannel bus, or any of a variety of other bus structures commonly used and known.

It will be recognized that additional devices may be coupled via IDE controllers and other connectors to the various buses, providing resources and buffering for external devices. The flexibility of the computer system therefore is not restricted to the particular example shown in the figure. Moreover, as stated above, additional devices may be added to a computer system via expansion buses, by inserting into a bus slot an expansion card that is connected via a cable or wire to the additional device.

Devices that exchange data with the microprocessor typically are assigned I/O space allocations that may or may not be shared with other devices. Devices include memories, as well as peripheral and other devices. To encode the process of communicating with the devices in the system, the POST typically creates within non-volatile memory an allocation map, allowing a particular device to be identified by an identifier or handle of only a few bits, and a controller translate the handle into an identification of the corresponding resource and by I/O address.

For example, a printer may have an identifier or handle or other brief identifier, a resource such as an interrupt request line, and an I/O space allocation for addressing characters from the microprocessor to the printer. The microprocessor can then address the particular I/O location to send data to the printer, and the printer can use the interrupt request line to indicate a ready to receive data status or a printer-problem status. The map is in the form of a table, and if it is in nonvolatile memory, will start up with the list of resources assigned to configurable installed devices during a previous session.

Figure 2:
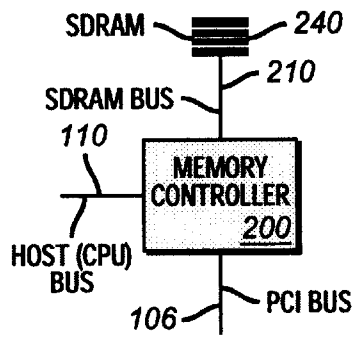
FIG. 2 is a schematic diagram showing a typical memory controller coupled to a processor bus or host bus, to a PCI bus, and to an SDRAM (memory) bus.

Referring now to FIG. 2, a typical memory controller 200 is coupled to a processor bus or host bus 110, to a PCI bus 106, and to memory bus 210. Further coupled to the memory bus 210 is a memory module 240, which resides within the DRAM array 102. The SDRAM memory module 240 may be configured either as a DIMM or as a SIMM package, or other configuration. The central processing unit 100 accesses the memory module 240 by placing requests on the processor bus (i.e., host bus 110).

Upon detecting and receiving a pending memory request, the memory controller 200 decodes the request and provides an address and timing information to the bus 210. The memory controller 200 asserts the appropriate commands and other signals as needed. Often, the memory controller 200 stores several requests of the read type, or several requests of the write type to prevent having to reverse the memory bus 210 except as necessary. Because reversing the memory bus requires additional settling time, and because multiple read accesses or multiple write accesses can occur in rapid succession without having to reverse. the memory bus 210, the memory controller 200 often groups memory access addresses. Also, paging is possible.

The Main Memory and the Memory Personality Module

Memory controller 200 typically provides a large number of functions, particularly in systems having multiple processors. For example, memory controller 200 receives and services tagged memory access requests from central processing unit 100 over host bus 110. When central processing unit 100 desires to read data from, or write data to, a memory module, the central processing unit 100 provides a memory access request to the host bus 110. The memory access request includes a tag and an address. On a write access, the request also includes data. The tag is an identifier or value that is unique among requests that are currently pending on the host bus 110.

The memory controller 200 services pending requests by accessing memory to read data from, or write data to, a memory location within the memory (DRAM 102) corresponding to the address. When the access request is a write request, the memory controller 200 provides the data (and a write command) over memory bus 310 to a memory module, which stores the data at the appropriate address. When the access request is a read request, the memory controller 200 provides a read command and the address over the memory bus 310 to a memory module, which responds with the data from the memory location corresponding to the address within the memory module. The memory controller 200 may append a tag, and provides the data with the tag to the host bus 110. The central processing unit 100 thereupon recognizes the tag and receives the data from the host bus 110, and clears the tag for subsequent reuse.

Unfortunately, the memory controller 200, however, is typically configured for one (and only one) type of memory. For example, the memory controller 200 may be configured for a particular DRAM protocol. The signals provided over memory bus 210 are "homogeneous," in that all memory modules receive and provide signals over memory bus 210 according to the same protocol. Normally, this has not been problematic; all devices in the memory array have normally been identical. The computer user typically has selected a state-of-the-art memory array, having identical memory modules.

As indicated above, however, this quickly becomes problematic when a computer system is already owned, having a significant number of expensive memory modules, and representing a large financial investment. Such is often the case with respect to large-scale servers. Moreover, often only a small increase in memory capacity is required. Owners of such systems have been faced with the Hobson's choice of either struggling along with their current (inadequate) memory systems or confronting the exorbitant expense of upgrading the entire memory array.

The present invention, therefore, adds an attractive, third alternative: replacing part of the memory array while leaving the remainder intact. The resulting system, while perhaps suboptimal, allows the owner of the computer system to upgrade slowly. Some of the DIMMs or SIMMs in the computer system's memory array may be replaced with newer, higher-speed devices, while other pre-existing devices are left in the system. Thus, partial upgrade is made possible.

According to the invention, a memory personality module 300 (FIGS. 3 and 4) is included between the dynamic RAM 102 and the memory controller 200. The memory personality module 300 provides an interface between the memory controller 200 and various devices within the dynamic RAM 102. A second memory bus 310 and memory module 320 (or set of memory modules 320) are added, coupled via the personality module 300 to the first memory bus 210.

In the systems according to the present invention, several different types, speeds, and configurations of memory modules may be included in the same memory array. Interface between the multiplicity of memory modules and the memory controller 200 is accomplished by inclusion of one or more memory personality modules. The memory personality module 300, or RAM personality module (since memory typically is composed of RAM devices), provides an interface between the memory controller 200 and a subset of the memory modules.

Each memory personality module 300 has a front end 302 and a back end 306. The back end 306 of each memory personality module 300 connects to a subset of memory modules within the memory array. The front end 302 connects to the memory controller 200.

Moreover, each memory personality module 300 is able to read the memory type, speed, size, configuration, as well as other operating parameters, directly from the memory module, and return that information via a protocol known as the $I^2C$ bus protocol. Each memory module includes several pins that may be read by the memory personality module and by other devices in the system, providing device type information. The $I^2C$ device type and bus protocol are described in greater detail with respect to Table 1. Device size, grouping and address translation is described with reference to FIGS. 6, 7, and Tables 4–10. However, it should be recognized that the present invention allows a user to add, remove, and substitute individual memory modules within a memory array. Users need no longer replace entire memory arrays in one step.

The Memory Personality Module

Figure 3:
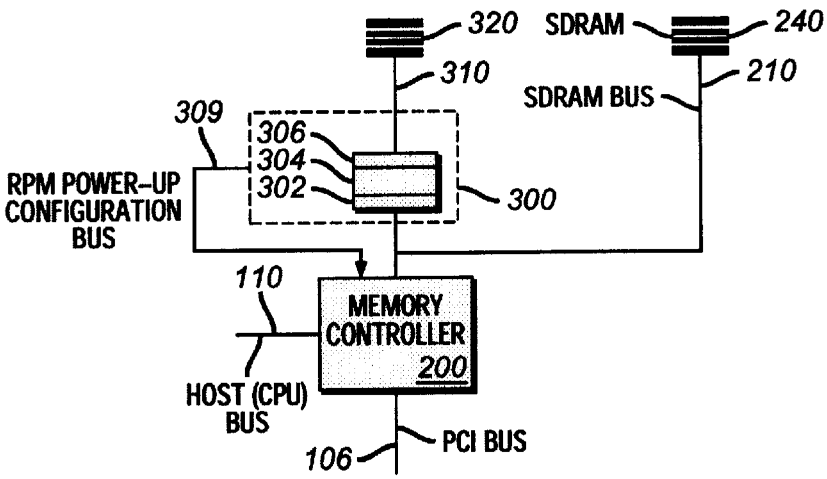
FIG. 3 is a schematic diagram showing a memory controller system including a RAM personality module (RPM), according to one embodiment of the present invention.
Figure 4:
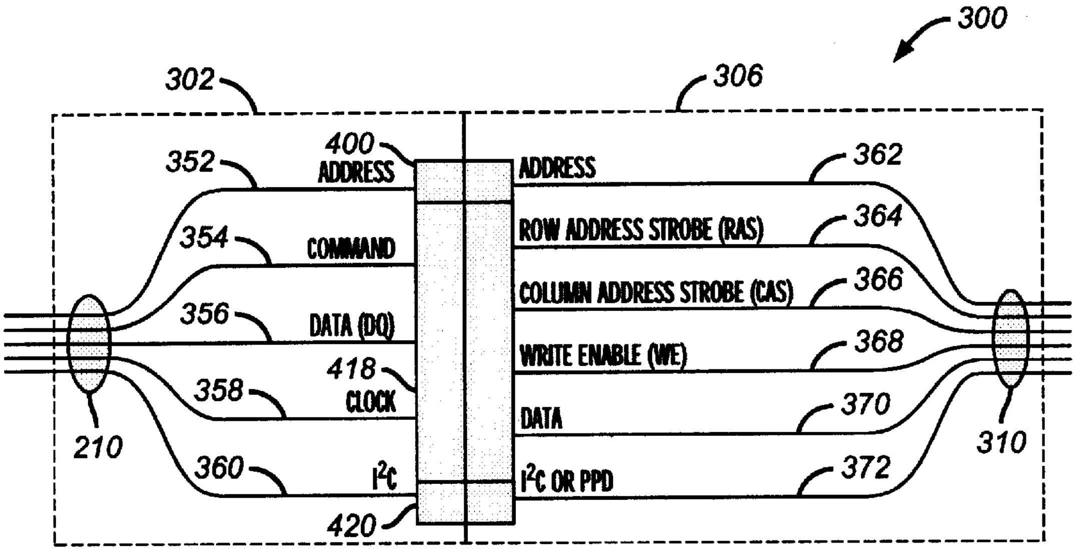
FIG. 4 is a schematic diagram showing one embodiment of a RAM Personality Module according to the present invention.

Referring now to FIGS. 3 and 4, a memory controller system including a RAM personality module 300 (RPM) is shown, according to the present invention. The RPM 300 is an example of a memory personality module. The RPM 300 has a front end 302 and a back end 306. The front end 302 is designed to be compatible with the memory controller 200. The back end 306, however, operates according to a protocol specifically designed for a particular memory module 320. The front end 302 and the back end 306 each have a memory address bus 352 and 362 (FIG. 4) coupled thereto. Memory address bus 352 is contained within memory bus 210, and memory address bus 362 is contained within memory bus 310.

According to the invention, therefore, the memory personality module 300 can be interposed between a memory controller 200 designed for a first type of memory module 240 and a memory module 320 of a second type. The front end 302, coupled to the memory controller 200, provides address, control, and data signals according to the protocol for which the memory controller 200 is designed. The back end 306 exchanges address, control, and data signals with a memory module 320 of the second type.

Implementation of a Ram Personality Module

The memory personality module 300 is designed for a specific memory module type, the memory module 320 connected to the back end 306 thereof, and alters the mapping of address, data, and control bits between the front end 302 and the back end 306.

Referring now to FIG. 4, the RPM 300 of FIG. 3 is shown in greater detail. The RPM 300 has two ends, a front end 302 providing and receiving signals as a generic DRAM, and a back end 306 providing and receiving signals according to s specific memory module connected thereto. As an example, FIG. 4 shows the device connected to the back end 306 is an Extended Data Out (EDO), and the device connected to the front end 302 is an SDRAM memory interface.

The RPM 300 has three sections: an address translation section 400, a control and data translation section 410, and a serial presence detect (SPD) section 420. The address translation section 400 performs selectable address translation between the front end 302 memory address on address bus 352 (within bus 210 from the memory controller 200) and the back end 306 memory address on address bus 362 (within bus 310 to the memory module 320). The control and data translation 410 provides translation between timing and electrical (physical layer) protocols. During system initialization, the serial presence detect section 420 determines what type memory module 320 is, and controls the selectable address translation section 400 and interface and memory controller 410.

Referring again to FIG. 4, at the front end 302, the address translation section 400 receives a memory address on memory address bus 352. The number of bits of memory address in the memory address bus 352 depends on the selection of memory controller 200 but is at least enough to carry the row address during RAS and the column address during CAS. The invention will be described in the embodiment as though the memory address on address bus 352 is compatible with memory controller 200, although it will be recognized minor deviations are possible. The memory address on address bus 352 contains the row address bits of the memory address when the memory controller 200 commands RAS (the Row Address Strobe), and the column address bits of the memory address when the memory controller 200 commands CAS (the Column Address Strobe). The row and column address bits define the memory location within the memory module 320. The chip select (CS) signal, which is part of the command signal 354, defines the memory module 320 within the memory space of the memory controller 200.

The control and data translation 410 also receives a command input 354, the data (DQ) signal 356, and a clock signal 358.

The command signal 354 allows the memory controller 200 to command the operation of the RPM 300, and the access of the memory module 320. The clock signal 358 allows the RPM 300 to provide data synchronously, by providing a clock signal with which the data may be synchronized.

The serial presence detect section 420 receives a presence detect value 550, providing information to the serial presence detect section 420 indicating the type, speed, and size of the memory modules to the memory controller 200. The presence detect value 550 is described more fully with reference to Table 1.

The back end 306 of the RPM 300 is described as compatible with, in this example, the EDO memory module 320, although minor deviations are possible. The address translation section 400 provides a memory address on memory address bus 362. The memory address bus 362 includes the address of the memory location to be accessed within the EDO memory module 320. Although the memory address bus 362 may be identical to the memory address on address bus 352, such is not always the case. The memory address bus 362 may have a different memory-mapping scheme than the memory address on address bus 352.

Selectable address translation depends on the device type 610' of memory module 240 with which the front end is compatible, and on the device type 602' of memory module 320 with which the back end is compatible. Selectable address translation is described in more detail with respect to FIGS. 6, 7 and Tables 4–10.

In this example, the SDRAM interface and memory controller 410 provides a RAS signal 364, a CAS signal 366, a write enable (WE) signal 368, and a data bus 370. The RAS signal 364, the CAS signal 366, and the write enable signal 368 are provided to the memory location as necessary to access the memory. Access may be either write or read access. The data signal 370 is coupled to the second EDO data bus 310 as well, and allows data to be written from the RPM 300 to the EDO memory module 320 or from the EDO memory module 320 to the RPM 300. The serial presence detect section 420 provides an $I^2C$ signal 360. The $I^2C$ bus is used to indicate the type of memory connected to the back end 306 of the RPM 300. The presence detect bits of the memory module 320 is read over the bus 372 to the back end 306 of the RPM 300. The serial presence detect section 420 of the RPM 300 converts this information into the serial presence detect protocol over the $I^2C$ bus 360 to the memory controller 200.

The memory address translation typically includes, according to many embodiments of the present invention, multiplexing the processor or PCI bus address onto the memory address bus. Depending on the configuration of the particular memory component, however, different pin mapping of address bits is required to translate the memory address input to the memory address output. Also, the memory controller can include various registers for disabling particular blocks of memory, the registers possibly writeable by the processor.

The front end 302 of a RAM personality module includes row precharge, column address strobe latency, active command to precharged command delay, active command to access command delay, data in to precharge command delay, refresh to activate command delay, and address setup delay appropriate to the memory component. The back end of the memory personality module 300 or second tier memory controller component is compatible with the memory module 320, in at least the above mentioned parameters.

Row/Column Addressing Ras & Cas Cycles

The address translation provided by the RPM 300 is typically necessary if a memory module 320 is to be used with a memory controller 200 with which the memory module 320 is incompatible. Memory modules often vary in size and configuration. Also, several physical memory modules are often organized into one logical memory module. Translating address, timing, and electrical considerations are therefore indispensable.

Most memory modules are organized into rows and columns of memory words. Processor buses such as host bus 110 often provide 32 bits or more of address. The memory controller 200 therefore multiplexes the address into a row address and a column address. The memory controller 200 typically provides a row address during a row address cycle, followed by a column address during a column address cycle. The number of bits of row address and the number of bits of column address depend on the protocol for which the memory controller 200 is designed.

However, memory bus 210 is generally not compatible with all memory modules 320, simultaneously. Therefore, to provide an interface between the memory controller 200 and the memory module 320, various address bits may have to be reassigned. The reassigning of address bits, or address translation, is performed within the memory personality module 300, i.e. between the front end 302 and the back end 306. Along with timing and electrical considerations, also performed by the RPM 300, address translation provide an opportunity to use new memory modules 320 with previously purchased memory systems and bus 210.

Multiple Device Sizes: Logical Dimms

Memory modules are typically available in a wide range of sizes, configurations, speeds, voltage and power levels, as well as availability of other features such as extended data out (EDO). According to the $I^2C$ protocol, many modern memory and other devices identify themselves on a predetermined set of pins, so that other devices can identify the particular type of device. Many memory modules currently available, and many memory modules that are anticipated to be introduced in the future, are compatible with the $I^2C$ protocol. The $I^2C$ protocol, and the ability of memory modules to identify themselves to, for example, a memory controller, is described below with particular reference to Tables 1 through 10 and FIGS. 5 through 7.

Figure 10:
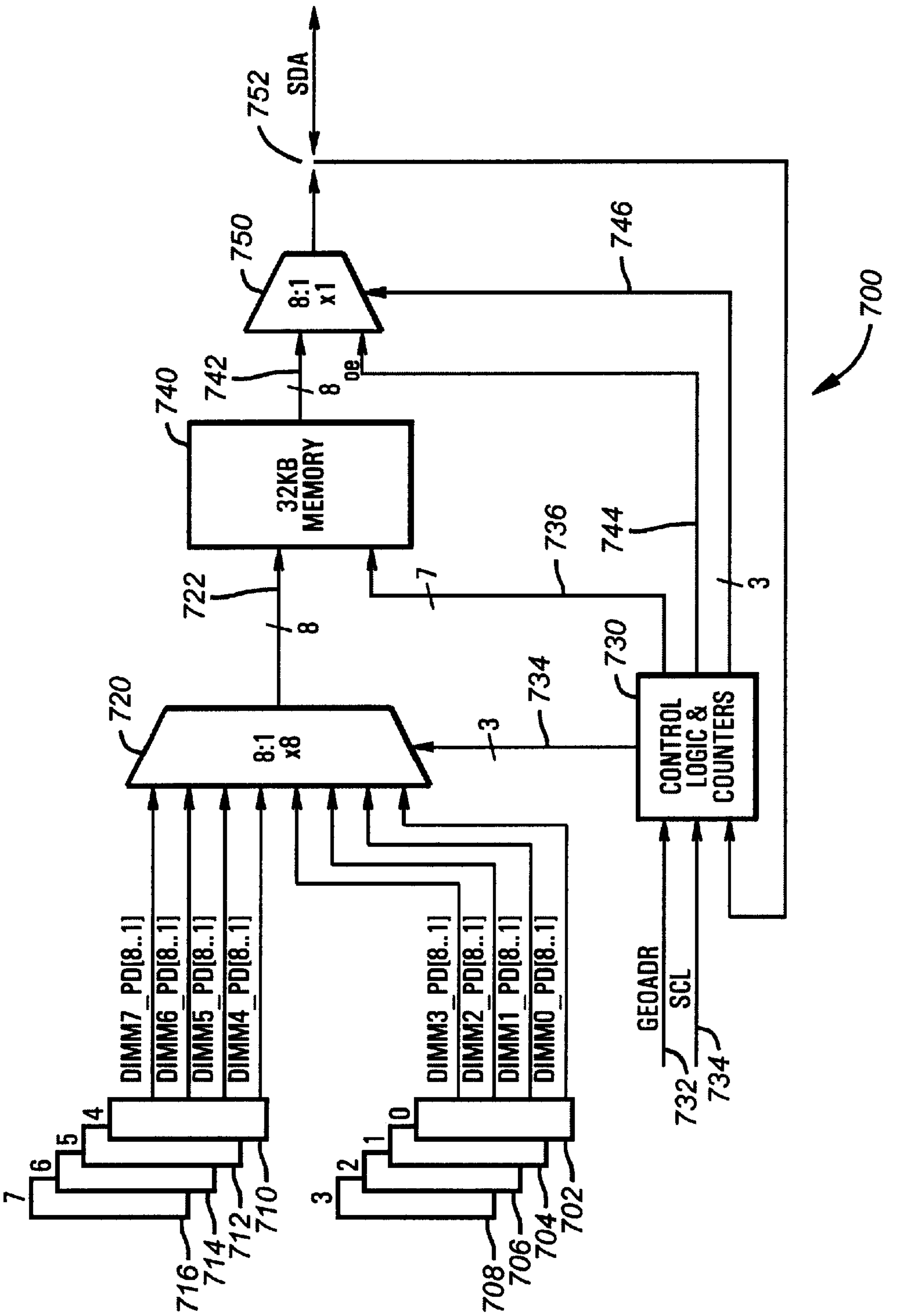
FIG. 10 is a schematic diagram of a parallel to serial presence detects conversion logic for up to eight logically grouped sets of DIMMs or SIMMs.

Many older device types DIMMs and SIMMs, such as FP (fast page) and EDO DRAMs, use an eight-bit parallel presence detect value which is incompatible with, and must be converted into, the $I^2C$ serial presence detect value 550, as shown in FIG. 10.

The present invention allows multiple physical memory modules to be grouped together as a logical memory module 320. The present invention is able to detect the number (and the type) of such physical memory modules through the parallel-to-serial or serial-to-serial presence detect translation, and adjust addressing and timing parameters and to "hide" the nature of the physical devices from the memory controller 200. As used in the present invention, it should be understood that "hide" means to make differences in the operating parameters of the memory modules have no discernable differences in terms of accessibility to or by memory controller 200. All of the physical memory modules thus grouped (either two or four physical devices) are connected to the back end 306 of a memory personality module 300 via memory bus 310. Thus, the memory controller 200 at the front end 302 of the memory personality module 300 sees the multiple memory modules as a single logical memory module that operates according to the standard protocol of the memory controller 200. In this way, memory modules of different sizes may be used in the same memory subsystem.

For example, two or four 8-MB EDO memory DIMMs may be organized to form one 16-MB or one 32-MB logical memory module 320, coupled to the back end 306 of the same memory personality module 300. The memory personality module 300 performs all necessary address translation between the memory controller 200 and the 16-MB or 32-MB logical memory module. A 3-bit physical device address 806 (FIG. 5B) to be discussed in more detail below and existing on SPD section 420 selects the particular device. Other 16-MB or 32-MB memory modules, including other logical memory modules, may be connected to the same memory controller. The other 16-MB or 32-MB memory modules may be compatible with the protocol for which the memory controller is designed, or may include additional memory personality modules.

When a new type of memory is introduced into the market, a user may substitute a memory module of the new type into a pre-existing memory array, and yet have with the present invention other memory modules of other types within the system. Assuming the memory module is $I^2C$ compliant, the memory personality module 300 reads a presence detect value 550 (Table 2) directly from the new device. The memory personality module 300 then alters the mapping of address bits between the front end memory address on address bus 352 and the back end memory address on address bus 362, as necessary, according to the memory controller protocol and the presence detect value.

The use of multiple physical devices is described below with reference to Tables 4–10. Specifically, the use of two physical devices and the use of four physical devices are described in detail. Three parameters control the operation of the memory personality module 300 in such circumstances. The first such parameter is the number of such physical devices within the memory module 320. The second parameter is the size 510, organization 604 and type of each physical device, which is determined from a presence detect value 550 read directly from the device itself. The third such parameter is the protocol used at the front end 302 and on the bus 210. When two physical devices are used, translation scheme 690' is selected, and protocol of the front end 302 is found in column 610 of Table 2, FIG. 7, Tables 4–6, Table 7, and 9. When four physical devices are used, translation scheme 692 is selected, and the protocol of the front end 302 is found in column 612 of Table 2, Tables 4–6, Table 8, and Table 10.

The SPD Protocol Device Type

The present invention is able to detect the type of each physical memory module within the logical memory module 320. Such detection is performed by reading "Presence Detect" value 550 from each physical device within the logical memory module 320. The back end 306 of the memory personality module 300 reads the presence detect value 550 from each physical memory module and adjusts addressing and tuning parameters within the memory personality module 300 to hide the nature of the physical memory modules from the memory controller 200.

Memory modules within the logical memory module 320 indicate the presence detect value 550 of each DIMM by reporting the memory personality module 300 upon initialization. Many older and current devices provide the presence detect value along an 8-bit presence detect (PPD) bus. In this case, the parallel presence detect value is preferably converted into a serial presence detect (SPD) value. The Serial Presence Detect value is more fully described in the Intel Serial Presence Detect (SPD) specification, which is hereby incorporated by reference. Regardless of the format in which the presence value identifying the type of memory DIMMs coupled to the back end 306 of the memory personality module 300, the memory personality module 300 stores the presence detect value 550 from each of the physical devices, i.e. the DIMMs coupled to the back end 306.

When necessary, parallel to serial presence detect conversion is performed according to logic illustrated in FIG. 10. Referring now to FIG. 10, a schematic diagram of a parallel to serial presence detect conversion logic is shown, for up to eight DIMMs or SIMMs. The logic in FIG. 10 converts the Parallel Presence Detect Bits on bus 372 into Serial Presence Detect protocol as defined on bus 360. As shown in FIG. 10, four EDO DIMMs are grouped together to emulate the equivalent of one logical SDRAM DIMM. The 32 KB ROM is used as a look-up table. The PPD bits are used as an index pointer into the appropriate lookup table (which is an array of indexes). The 32 KB ROM is partitioned to be a multiple of 128 bytes. The 32 KB ROM will provide the equivalent SDRAM memory information by converting the timing and size/density information of EDO DIMMs. The pointer or counter will be incremented until a total of 128 bytes of information have been provided. It will be appreciated, however, that any physical DIMM having a defined presence detect value 550 may be used in place of the DIMMs shown in FIG. 10. As shown in FIG. 10, eight fast page mode or extended data out DIMMs 702–716 collectively form a set of memory modules 320. It will be understood that the sets of memory modules 320 may comprise any even number of such DIMMs, and that the conversion logic of FIG. 10 can easily be adapted to accommodate any even number of such DIMMs. The memory personality module 300 has a back end 306 adapted to the particular DIMMs, or set of DIMMs and further is capable of storing or detecting the presence detect value 550 provided to the memory personality module 300 from the DIMMs 702–726 upon initialization.

Each of the DIMMs 702–716 is connected via a dedicated 8-bit bus to a multiplexer 720. The multiplexer 720 selects one of the DIMMs 702–716 and its dedicated presence detect bus and provides the selected presence detect value over an eight bit parallel presence detect bus 722.

The multiplexer or selector 720 is controlled by a control logic and controller 730. The control logic and controller 730 receives a system geographic address 732 and a serial clock 734, according to the $I^2C$ protocol. The control logic and controller 730 provides a three bit selection signal over a selection bus 734 to the multiplexer and selector 720. The three bit selection signal cycles through the eight DIMMs 702–716, passing each of the parallel presence detect values 550 to the eight bit parallel presence detect bus 722 in turn.

The parallel presence detect bus 722 contains the eight high address bits used in a look up table to obtain the serial presence detect value. The seven low address bits are provided by the control logic and controller 730 over a separate seven-bit bus 736. Both the high address on bus 722 and the low address on bus 736 are provided to a 32 KB ROM 740 or other memory such as Flash, embedded DRAM or SRAM, containing the corresponding look up table. The ROM 740 provides the resulting parallel presence detect value over an eight bit parallel presence detect bus 742, which, together with an output enable signal 744, is provided to an 8-to-1 multiplexer and controller 750. The 8-to-1 multiplexer and controller 750 is controlled by a 3-bit selection signal from the control logic and controllers 730, received over a 3-bit bus 746.

The output of the 8-to-1 multiplexer and controller 750 is the serial data corresponding to the serial presence detect value 550. The serial presence detect value 550 is returned to the control logic and controller 730, and is further provided as an output from the parallel to serial presence detect conversion logic 700 depicted in FIG. 10. It must be understood, however, that the conversion illustrated in FIG. 10 is only necessary when the particular DIMMs 702–716 are of the older parallel presence detect variety, as most newer DIMMs provide the presence detect value 550 in a serial format.

Referring now to the incorporated SPD specification, a table showing a portion of $I^2C$ protocol device type definition is shown. The SPD protocol allows a computer system to read a device type directly from a memory module over a two-wire bus. The two wires, named a Serial Data (SDA) signal and a Serial Clock (SCL) signal, carry information between the devices on the two-wire $I^2C$ bus. According to the $I^2C$ specification, $I^2C$ devices on the memory modules are referred to as slave devices, while $I^2C$ masters are referred to as master devices. Master devices are those that initiate data transfers and provide clock and address signals; slave devices are those that are addressed by the master devices.

According to the SPD protocol, each memory module has a standard device type, according to a central authority for assigning device types. The device type is provided by the memory module 320 over an $I^2C$ bus or parallel presence detect bus 372. Accordingly, master devices on the $I^2C$ bus 360 can determine the device type of each slave device.

Referring now to Table 1, an industry standard for the eight-bit parallel presence detect (PPD) value 550, hard wired into each memory module, is shown. The presence detect value 550 is a one-byte (eight bit) value having four lower order bits shown in Table 1. The bits are individually referred to as PD1–PD8. Because only the lower-order four bits are relevant to address translation, references to the presence detect value 550 will be understood as referring to the lower order four bits. Each 168-pin memory module has four pins identified as 502, 504, 506 and 508 (pins 164, 80, 163, and 79) that are internally hard-wired to rail voltages according to the lower order bits of the device type. Thus, the device includes four pins that identify the device type.

Referring to Table 1, the first four columns (columns 502, 504, 506 and 508) show hard wired connection of various pins, creating the presence detect value 550. For example, as shown in the first column of Table 1, i.e., column 502, pin no. 164 of a 168 pin DIMM is tied either to Vss, or is left without a connection (NC), thereby defining a one-bit value of 0 or 1 respectively. Likewise, pins 80, 163, and 79 are tied either to Vss or are left without a connection, defining particular bits of the presence detect value as 0 or 1 respectively. Each four-bit presence detect value 550 uniquely defines a device type, including an identification of a DIMM density (i.e., size) 510. The DIMM configuration 514 is also identified by the presence detect value 550, as shown. Whether the EDO density (i.e., size) 510 is single row or double row is indicated as the number of banks 512. The number of row and column address bits on bus 362 (within bus 310) is shown in column 520.

TABLE 1

| PPD Value | | | | | | | | | |
|---|---|---|---|---|---|---|---|---|---|
| 550 | | | | | | | | | |
| 502 | 504 | 506 | 508 | 510 | | | | 520 | |
| PD Bits | | | | DIMM | | | | | |
| 4 | 3 | 2 | 1 | Density | 512 | 514 | DRAM | DRAM Address | |
| 164 | 80 | 163 | 79 | MB | # Banks | DIMM Configuration | Configuration | Row | Column |
| NC | NC | NC | NC | | | No Module Inserted | | | |
| $V_{ss}$ | $V_{ss}$ | $V_{ss}$ | $V_{ss}$ | 2 | 1 | 256K x 64/72, 256K x 72 | 256K x 16/18 | 9 | 9 |
| $V_{ss}$ | $V_{ss}$ | $V_{ss}$ | NC | 4 | 2 | 512K x 64/72, 512K x 72 | 256K x 16/18 | 9 | 9 |
| $V_{ss}$ | $V_{ss}$ | NC | $V_{ss}$ | 4 | 1 | 512K x 64/72, 512K x 72/80 | 512K x 8/9 | 10 | 9 |
| 3 $V_{ss}$ | $V_{ss}$ | NC | NC | 8 | 2 | 1Mx64/72, 1Mx72/80 | 512K x 8/9 | 10 | 9 |
| 4 $V_{ss}$ | NC | $V_{ss}$ | $V_{ss}$ | 8 | 1 | 1Mx64/72, 1Mx72/80 | 1M x 4/16/18 | 10 | 10 |
| 5 $V_{ss}$ | NC | $V_{ss}$ | NC | 16 | 2 | 2Mx64/72, 2Mx72/80 | 1M x 4/16/18 | 10 | 10 |
| 6 $V_{ss}$ | NC | NC | $V_{ss}$ | 8 | 1 | 1Mx64/72, 1Mx72 | 1M x 16/18 | 12 | 8 |
| 8 NC | $V_{ss}$ | $V_{ss}$ | $V_{ss}$ | 16 | 2 | 2Mx64/72, 2Mx72 | 1M x 16/18 | 12 | 8 |
| 9 NC | $V_{ss}$ | $V_{ss}$ | NC | 16 | 1 | 2Mx64/72, 2Mx72/80 | 2M x 8/9 | 11 | 10 |
| A NC | $V_{ss}$ | NC | $V_{ss}$ | 32 | 2 | 4Mx64/72, 4Mx72/80 | 2M x 8/9 | 11 | 10 |
| B NC | $V_{ss}$ | NC | NC | 32 | 1 | 4Mx72, N/A | 4M x 4/1/18 | 12 | 11 |
| NC | $V_{ss}$ | NC | NC | 32 | 1 | 4Mx64, 4M72/80 | 4M x 4/16 | 12 | 10 |
| NC | NC | $V_{ss}$ | $V_{ss}$ | 64 | 2 | 8Mx64/72, 8Mx72 | 4m x 16/18 | 12 | 10 |
| NC | NC | $V_{ss}$ | NC | 64 | 1 | 8Mx64/72, 8Mx72/80 | 8M x 8/9 | 12 | 11 |
| NC | NC | NC | $V_{ss}$ | 128 | 2 | 16Mx64/72, 16Mx72/80 | 8M x 8/9 | 12 | 11 |
| NC | NC | NC | NC | 128 | 1 | 16Mx64/72, 16Mx72/80 | 16M x 4 | 13 | 11 |
| $V_{ss}$ | $V_{ss}$ | $V_{ss}$ | $V_{ss}$ | 128 | 1 | 16Mx64/72 | 16M x 16/18 | TBD | TBD |
| $V_{ss}$ | $V_{ss}$ | $V_{ss}$ | NC | 256 | 2 | 32Mx64/72, 32Mx72 | 16M x 16/18 | TBD | TBD |
| $V_{ss}$ | $V_{ss}$ | NC | $V_{ss}$ | 256 | 1 | 32Mx64/72, 32Mx72/80 | 32M x 8/9 | TBD | TBD |
| $V_{ss}$ | $V_{ss}$ | NC | NC | 512 | 2 | 64Mx64/72, 64Mx72/80 | 32M x 8/9 | TBD | TBD |
| $V_{ss}$ | NC | $V_{ss}$ | $V_{ss}$ | 512 | 1 | 64Mx64/72, 64Mx72/80 | 64M x 4 | TBD | TBD |
| $V_{ss}$ | NC | NC | NC | | | EXPANSION CODE | | | |

The eight-bit presence detect value 550 is typically represented as a hexadecimal number. The four higher order bits of the eight-bit presence detect value define device parameters not relevant to selectable address translation. The higher order bits are also hardwired internally, however, and indicate whether the device is a fast-page memory, or a fast-page memory with extended data out (EDO). The higher-order bits also indicate the speed of the memory, whether ECC is available, and whether the data output of the device includes a parity bit. If pin 81, which is bit 5 of the full eight-bit presence detect value, is tied to $V_{ss}$, the device is a fast-page device. If the pin 81 is left with no connection, the device is a fast-page device with extended data out (EDO). Bits 6 and 7 of the presence detect value identify the speed of the device.

TABLE 1a

EDO Detection

| PD Bit | | Fast Page | Fast Page with EDO |
|---|---|---|---|
| PD 5 | 81 | $V_{SS}$ | NC |

DIMM Speed ($T_{RAC}$)

| PD Bit | | 40 ns | 50 ns | 60 ns | 70 ns | 80 ns |
|---|---|---|---|---|---|---|
| PD 6 | 165 | NC | $V_{SS}$ | NC | $V_{SS}$ | NC |
| PD 7 | 82 | $V_{SS}$ | $V_{SS}$ | NC | NC | $V_{SS}$ |

ECC/Parity Detection

| PD Bit | | ECC | Parity |
|---|---|---|---|
| PD 8 | 166 | $V_{SS}$ | NC |

ID BITS (May be "Dot-ORed" at system level)

| | | ×64 Parity/×72 ECC | ×72 Parity/×80 ECC |
|---|---|---|---|
| ID0 (DIMM Type) | 83 | $V_{SS}$ | NC |
| | | Normal Refresh | Self Refresh |
| ID1 Refresh Mode | 167 | $V_{SS}$ | NC |

Additional information on the presence detect values may be obtained by referring to the IBM Application notes, which are hereby incorporated by reference.

Each memory module, depending upon its density (or size 602) and organization 604, may differ from one another in the number of row and column address bits. Moreover, a memory module 320 connected to the back end 306 of the RPM 300 typically has a different internal architecture than the logical memory module 240 connected to the front end 302 of the RPM 300. For example, a SDRAM device connected directly to the bus 210 at the front end 302 has internal banks while a EDO DIMM device 320 connected to the back end 306 of the RPM 300 does not have internal banks and so the address translation must take into account of such differences. Table 2 shows what type, size and organization of a SDRAM device connected to the front end 302 of the RPM 300 can be emulated by a given set of two or four EDO DIMMs connected to the back end 306 of the RPM 300. For example, as indicated in row number two of Table 2, two single-bank 8 MB EDO DIMMs at the back end 306 can emulate a single 16 MB SDRAM DIMM connected to the front end 302 of the RPM 300 as shown in column 610 of Table 2. Also, as indicated in row number two of Table 2, four single-bank 8 MB EDO DIMMS at the back end 306 can emulate a single 32 MB SDRAM DIMM connected to the front end 302 of the RPM 300 as shown in column 612 of Table 2.

Table 3 shows what type, size and organization of EDO devices connected to the back end 302 of the RPM 300 can be used to emulate a given type, size and organization of a SDRAM DIMM connected to the front end 302 of the RPM 300. For example as indicated in row number two of Table 3, a single-bank 32 MB SDRAM DIMM at the front 302 can be emulated by two single-bank 16 MB EDO DIMMs connected to the back end 306 of the RPM 300 as shown in column 602A or can be emulated by four single-bank 8 MB EDO DIMMs at the back end 306 of RPM 300 as shown in column 602B.

Logical Memory Modules Having Multiple Physical Devices

A computer system having a memory personality module 300 according to the present invention has the capacity to receive multiple memory modules of diverse types at the back end 306. When multiple small physical memory modules are used, the memory personality module 300 hides the actual physical structure at the back end 306 from the memory controller 200, which "sees" a single simulated "logical" memory module 320. When a single physical device is used, the logical memory module 320 is simply the physical device.

Referring now to Table 2, column 602 shows the DIMM sizes and the number of rows of various EDO DIMMs. The letters D or S in parenthesis indicate whether the DIMM is a single-row (S) or a double-row (D). The memory personality module 300 of the present invention dynamically adapts to whatever type of memory module 320 is connected to the back end 306. For example, memory module 320 may include, as a physical device, an 8-megabyte dynamic extended data out (EDO) DIMM. In the second column, column 604, the organization or configuration 514' of the physical DIMM is presented. For example, the 8 megabyte DIMM described in the first row of the table in Table 2 is organized as a double bank, 1K row by 512 column, 72 bit DIMM. The third column of the table in Table 2, column 606, shows the number of row and column address bits required to be driven to the 8 megabyte EDO DIMM by the back end 306 of the RPM 300.

The fourth column of the table shown in Table 2, column 608, indicates the four-bit PD value 550 for each EDO DIMM as a hexadecimal number. The Presence Detect Value 550 defines the device type to the RPM 300, and determines the bit assignment at back end 306.

The fifth and sixth columns 610, 612 of the table shown in Table 2 illustrate the ability of the present invention to emulate the physical structure of the particular memory module type from the memory controller. Either one, two, or four physical devices can be used to provide a single logical memory module. Column 610 shows the SDRAM DIMM size seen at the front end 302 of the memory personality module 300, when two physical EDO DIMMs of the size indicated in column 602 are implemented as a single logical DIMM connected to the back end 306 of the RPM 300. The memory controller 200 provides addresses 352 to the RPM 300 as though the RPM 300 were a memory module according to column 610. The sixth column of the table shown in Table 2, column 612, shows the apparent memory DIMM size seen at the front end 302 of the memory personality module when four of the physical EDO DIMMs of the size indicated in column 602 are implemented as a single logical SDRAM DIMM.

TABLE 2

| Physical (back end) | | | | Logical (front end) | |
|---|---|---|---|---|---|
| | | | | 610 SDRAM DIMM SIZE | 612 SDRAM DIMM SIZE |
| 602 EDO DIMM SIZE | 604 ORGANIZATION | 606 ROW/COL Addressing | 608 PD<3:0> (HEX) | (USING 2-TO-1 EDO TO SDRAM DIMM SUBSTITUTION) | (USING 4-TO-1 EDO TO SDRAM DIMM SUBSTITUTION) |
| 8M (D) | 2 × 512K × 72 | 10/9 | 3 | *(Note 3) | 2 × 16MB (S) *(Note 2) |
| 8M (S) | 1M × 72 | 10/10 | 4 | 16MB (S) | 32MB (S)/64MB (D) |
| 8M (S) | 1M × 72 | 12/8 | 6 | 16MB (S) | 32MB (S)/64MB (D) |
| 16M (D) | 2 × 1M × 72 | 10/10 | 5 | *(Note 4) | 64MB (D) |
| 16M (D) | 2 × 1M × 72 | 12/8 | 8 | *(Note 4) | 64MB (D) |
| 16M (S) | 2M × 72 | 11/10 | 9 | 32MB(S)/or 64MB (D) | *(Note 5) |
| 32M (D) | 2 × 2M × 72 | 11/10 | A | 64MB(D) | *(Note 8) |
| 32M (S) | 4M × 72 | 12/10 | B | *(Note 7) | 128MB (S) |
| 64M (D) | 2 × 4M × 72 | 12/10 | C | *(Note 8) | 256MB (D) |
| 64M (S) | 8M × 72 | 12/11 | D | 128MB (S)/ or 256MB (D) | 256MB (D) |
| 128M (D) | 2 × 8M × 72 | 12/11 | E | 256MB(D) | *(Note 9) |
| 128M (S) | 16M × 72 | 13/11 | F | *(Note 10) | 512MB (S)/or 1GB (D) |
| 256M (D) | 2 × 16M × 72 | TBD | 1 | *(Note 11) | 1GB (D) |
| 256M (S) | 32M × 72 | TBD | 2 | 512MB (S)/ or 1GB (D) | *(Note 12) |

(S) = Single Row DIMMs
(D) - Double Row DIMMs
Note 2: Requires four 0.5M × 72 EDO, but such DIMMs not available, or four 1M × 72 Double-Row EDOs, but then that will be substituting 2 sets of 16M (S) SDRAM DIMMs rather than 1.
Note 3: Logically 2 EDOs can support a 16MB (D) SDRAM DIMM.
Note 4: Logically 2 EDOs can support a 32MB (D) SDRAM DIMM if exists.
Note 5: Logically 4 EDOs can support a 64MB (S) SDRAM DIMM if exists.
Note 6: Logically 4 EDOs can support a 128MB (D) SDRAM DIMM if exists.
Note 7: Logically 2 EDOs can support a 64MB (S) SDRAM DIMM.
Note 8: Logically 2 EDOs can support a 128MB (D) SDRAM DIMM if exists.
Note 9: Logically 4 EDOs can support a 512MB (D) SDRAM DLMM if exists.
Note 10: Logically 2 EDOs can support a 256MB (S) SDRAM DIMM.
Note 11: Logically 2 EDOs can support a 512MB (D) SDRAM DIMM is exists.
Note 12: Logically 4 EDOs can support a 1GB (S) SDRAM DIMM if exists.

Table 3 shows the logical translation of EDO DIMMs. When either two physical memory modules listed in column 602A or four physical memory modules listed in column 602B are detected by the memory personality module 300, the memory personality module 300 reads the presence detect value 550 of each of the physical memory modules. The memory personality module 300 then simulates an interface with bus 210 identical to the interface of memory module 240 with bus 210. The first column of the table shown in Table 3, i.e., column 614 shows an apparent or emulated SDRAM DIMM size, seen at the front end 302 of the memory personality module 300 and compliant with memory bus 210. For example, memory bus 210 may be structured for direct connection with a 16-megabyte single row DIMM 240, as indicated in the first row of the table shown in Table 3.

The second column in the table shown in Table 3, i.e., column 616 shows the apparent organization of the emulated SDRAM DIMM, as seen at the front end 302 of the memory personality module 300. For example, a 16-megabyte single row DIMM is organized as a two megabyte by 72-bit SDRAM DIMM. Row and column addresses are received from 352 of bus 210.

The third column of the table shown in Table 3, i.e., column 618 shows the number of internal banks seen by the memory controller 200 at the front end 302 (despite actual use of different devices). The fourth column of the table shown in Table 3, i.e., column 620, shows the number of row and column address bits typically used on memory bus 352 to implement the SDRAM DIMM size shown in column 614. For example, a 16-megabyte single row SDRAM DIMM 240 is typically configured for eleven bits of row address and nine bits of column address. The fifth column, column 622, of the table shown in Table 3 shows the number of bank select bits necessary to select an internal bank from the number of banks shown in column 618. For example, when two internal banks are used, one bank select bit is necessary.

The sixth and seventh columns, 602A and 602B, show the actual physical devices used to mimic the logical device 320 described in column 614. As indicated above, the memory personality module 300 hides the actual physical device structure from the memory controller 200. The inclusion of columns 602A (when two such physical devices are grouped into a logical memory module 320) and 602B (when four such physical devices are grouped into a logical memory module 320) in the same table emphasizes ways to improve memory bandwidth.

The sixth column of the table shown in Table 3, i.e., column 602A, shows the physical EDO DIMM 320, both size and type, that may be connected to the back end 306 of the memory personality module 300, assuming two physical EDO DIMMs are used for each logical memory module. Translation 690 proceeds as per Tables 7 and 9. For example, two 8-megabyte single row EDO DIMMs may be used at the back end of a memory personality module 300 and mapped within the memory personality module to the front end and seen at the front end as a 16 megabyte single row SDRAM DIMM, as indicated in the first row of the table in Table 3. Alternatively, using smaller EDO DIMM physical memory modules, four physical EDO DIMM memory modules may be implemented as a single logical EDO DIMM memory module 320, as shown in the seventh column of the table in Table 3, i.e., column 602B. Translation scheme 692' proceeds as per Tables 8 and 10.

TABLE 3

| Logical (front end) | | | | | Physical (back end) | |
|---|---|---|---|---|---|---|
| 614 SDRAM DIMM SIZE | 616 ORGANIZATION | 618 # OF INTERNAL BANKS | 620 ROW/COL Addressing | 622 # OF BANK SELECT BITS | 602A EDO DIMM SIZE/TYPE (USING 2-TO-1 EDO TO SDRAM DIMM SUBSTITUTION) | 602B EDO DIMM SIZE/TYPE (USING 4-TO-1 EDO TO SDRAM DIMM SUBSTITUTION) |
| 16M (S) | 2M × 72 | 2 | 11/9 | 1 | TWO 8MB (S) (PD = 6) or TWO 8MB (S) (PD = 4) | XXX NA XXX (Note 2) |
| 32M (S) | 4M × 72 | 2 | 11/10 | 1 | TWO 16MB (S) (PD = 9) | FOUR 8MB (S) (PD = 6) or FOUR 8MB (S) (PD = 4) |
| 64M (D) | 2 × 4M × 72 | 2 | 11/10 | 1 | 2x TWO 16MB(S) (PD = 9) or TWO 32MB (D) (PD = A) | 2x FOUR SMB(S)(PD = 6) or 2x FOUR 8MB(S)(PD = 4) or FOUR 16MB(D) (PD = 8) or FOUR 16MB(D) (PD = 5) |
| 128M (S) | 16M × 72 | 4 | 12/10 | 2 | TWO 64MB (S) (PD = D) | FOUR 32 MB (S) (PD = B) |
| 256M (D) | 2 × 16M × 72 | 4 | 12/10 | 2 | TWO 64MB(S)(PD = D) or TWO 128MB (D) (PD = E) | 2x FOUR 32MB(S)(PD = B) or FOUR 64MB(D) (PD = C) |
| 512M (S) | 64M × 72 | 4 | 13/11 | 2 | TWO 256MB (S) (PD = 2) | FOUR 128MB(S)(PD = F) |
| 1GB (D) | 2 × 64M × 72 | 4 | 13/11 | 2 | 2x TWO 256MB(S) (PD = 2) | 2x FOUR 128MB(S)(PD = F) or FOUR 256MB(D)(PD = I) |

SPD: Obtaining Memory Module Type

Referring now to FIGS. 5A, 5B, 5C, and 5D, data transfer between the memory personality module 300 and the physical memory module coupled to back end 306 (i.e., via bus 310) proceeds accordingly to the SPD protocol. SPD uses I$^2$C bus to transfer information. Typically the I$^2$C protocol is a two-wire protocol that includes a serial data transfer (SDA) signal and a serial clock (SCL) signal. The start command 802 is initiated by a high-to-low transition the SDA data line while the SCL clock line is stable at a high level. The stop command is initiated by a low-to-high transition of the SDA data line while the SCL clock line is stable at a high level. Data is read serially from the SDA signal on the rising of the clock (SCL) signal, and must be stable during the HIGH period of the clock. A more complete definition of the SPD and I$^2$C may be found in the SPD and I$^2$C specifications, the disclosures of which are hereby incorporated by reference.

During memory initialization or memory discovery, the amount of memory in the system is determined. There are several ways to determine the total amount of system memory. The BIOS may perform memory writes with distinct data patterns to arbitrary memory addresses and read back. If the read values do not match with the written values then it is safe to assume that there is no memory in that address space. However, this approach is very time consuming especially in relatively large memory systems. The preferred approach is to have hardware assist the BIOS by letting the memory controller 200 via an I$^2$C controller perform the memory discovery or memory initialization. The I$^2$C controller (which may reside within the memory controller 200) scans the I$^2$C or SPD bus 360 for memory modules by progressively reading the I$^2$C device on each memory module. The protocol used by the I$^2$C controller for communicating with I$^2$C devices on the I$^2$C bus 360 is of known art and documented in numerous literatures. The data stored in the I$^2$C device within a memory module provides information of the memory module such as speed, type, density DIMM configuration, CAS latencies supported, etc. The format of the information stored in the I$^2$C devices within the memory modules may adhere to the referenced SPD specification, or to a SPD specification that is adopted in common by the memory module manufacturer(s). If memory modules connected to bus 210 of memory controller 200 are SDRAM DIMMs, communications over the I$^2$C bus 360 occur between the I$^2$C controller and the I$^2$C devices on the memory modules during the memory discovery or memory initialization process. However, if a RPM's back end contains PPD protocol devices such as EDO DIMMs and the front end is connected to the SDRAM-compatible bus 210, then communications over the I$^2$C bus 360 occur only between the I$^2$C controller and the RPM. In this case, the RPM reads the Parallel Presence Detect Value of the EDO DIMMs at its back end 306 via PPD bus 372 and performs the parallel-to-serial presence detect conversion from the PPD values to SPD compliant format and provides the SPD values over the I$^2$C bus 360. In this way, it appears to the I$^2$C controller as though the SPD information is being read directly from an equivalent of a single SDRAM DIMM that the RPM is emulating.

Figure 5A:
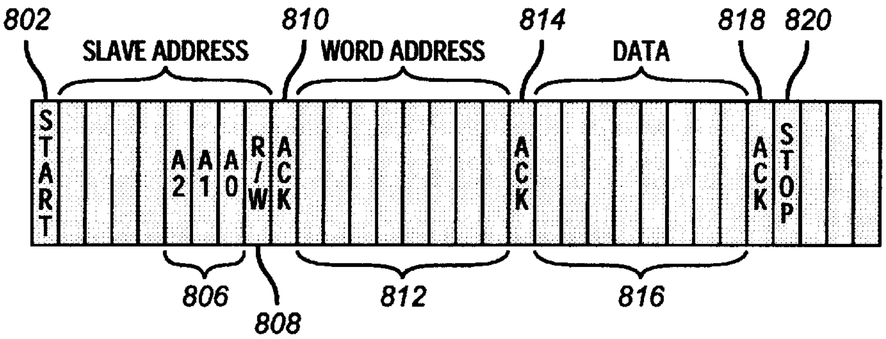
FIGS. 5A, 5B, 5C and 5D are diagrams showing various data streams according to the $1^2$C protocol, as known in the art.

FIG. 5A shows the I$^2$C protocol for a typical byte write operation over the I$^2$C bus 360 from a master I$^2$C device (that is, the I$^2$C controller) to a I$^2$C slave device (typically an I$^2$C device is an EEPROM device on a memory module, or as a part of a RPM). The primary use of the SPD bus 360 is to acquire memory configuration and parameters of the selected memory module. Therefore, most of the communications over the SPD bus 360 is likely to be read operations between the master I$^2$C device (I$^2$C controller) and the selected I$^2$C devices. However, write operations from the master I$^2$C device (I$^2$C controller) to slave I$^2$C devices (RPM, for example) are possible and may be used if so desired, say, to configure the RPM as an additional feature.

Referring to FIG. 5A, a typical byte write operation begins with the master (I$^2$C controller) generating a START condition 802. After the START condition, a 7-bit slave address is sent followed by a R/W bit 808. A "one" on the R/W bit 808 indicates a write operation. After an Acknowledge signal 810 is received from the slave I$^2$C device, the I$^2$C controller sends an 8-bit word address to select one of 256 data bytes within the slave I$^2$C device. After another Acknowledge signal 814 is received from the slave I$^2$C device, the I$^2$C controller sends the data byte. After another Acknowledge signal 818 is received from the slave I$^2$C device, the I$^2$C controller then sends a STOP signal and the byte write operation is complete.

Figure 5B:
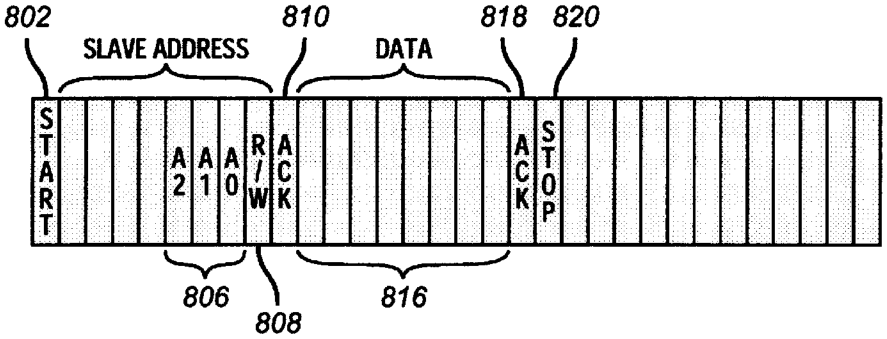

FIG. 5B shows a typical "current address" read operation by an I$^2$C controller from a I$^2$C slave device. As shown in FIG. 5B, it is not necessary to set the word address before reading the data 816 in a read operation. The word address of the byte being read from the slave $I^2C$ device is the word address of the previous write operation of the same $I^2C$ device incremented by one.

Figure 5C:
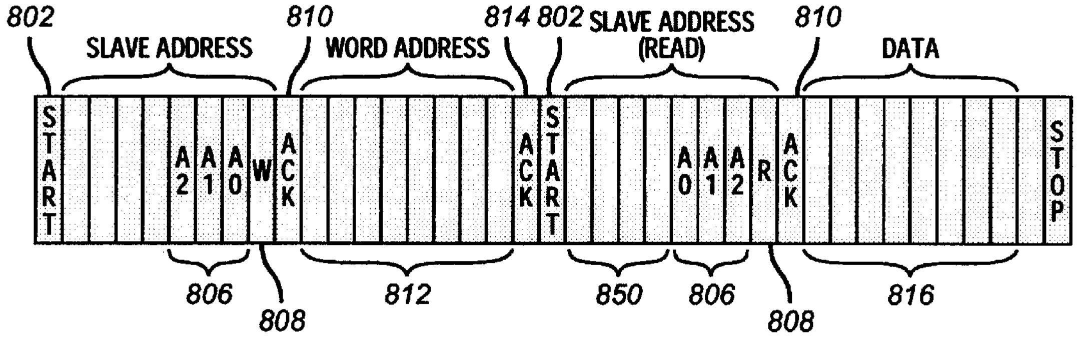

FIG. 5C shows a typical random read operation by an $I^2C$ controller from an $I^2C$ slave device. This read operation differs from that in Figure 5B in that the $I^2C$ controller reads the data 816 from a specific location set by the word address 812. As noted in FIG. 5C, after sending the word address 812 and receiving an Acknowledge signal 814, the $I^2C$ controller sends a repeated START condition 802 followed by a repeat of the slave address. The slave $I^2C$ device then provides an Acknowledge signal followed by the read data for the $I^2C$ controller.

Figure 5D:
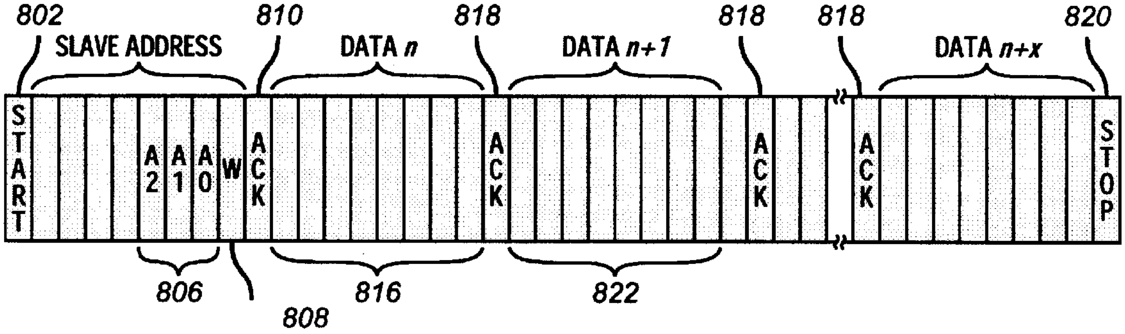

FIG. 5D shows a sequential read operation by the $I^2C$ controller from a slave $I^2C$ device. Refer to $I^2C$ Bus Specification, Philips Corporation, for a detailed account of $I^2C$ protocol and PC SDRAM Serial Presence Detect (SPD) Specification, Intel Corporation, for a detailed account of SPD protocol.

Selectable Address Translation

It must be pointed out that a memory module (such as a EDO DIMM) connected to the back end 306 of the RPM 300 has a set of signal protocol as well as timing parameters that are very different from that of a memory module (such as SDRAM DIMM) that is compatible with the front end 302 of the RPM 300. Thus, the RPM not only must perform the task of address translation between its front end 302 and the back end 306, but it must also meet the timing parameters at both its front end 302 and back end 306. Due to the inherently slower access times and other timing parameters of the EDO DIMMs compared to that of the SDRAM, it may be necessary for the memory controller 200 to increase the clock latency or delay between back to back memory requests at its front end 302 in order for the memory module at its back end 306 to keep up with the timing.

The memory personality module 300 also contain internal buffers for pending accesses, to reduce the frequency with which bus direction is reversed and thus maximize bandwidth on bus 310. Timing is managed by the memory controller 200 to accommodate read and write cycles as necessary to access the slowest physical memory module coupled to the memory personality module 300. Address and data bits may be posted in the memory personality module 300 pending write access to the memory bus 310. Posting allows the memory personality module 300 to reduce the latency of a write cycle.

Figure 6:
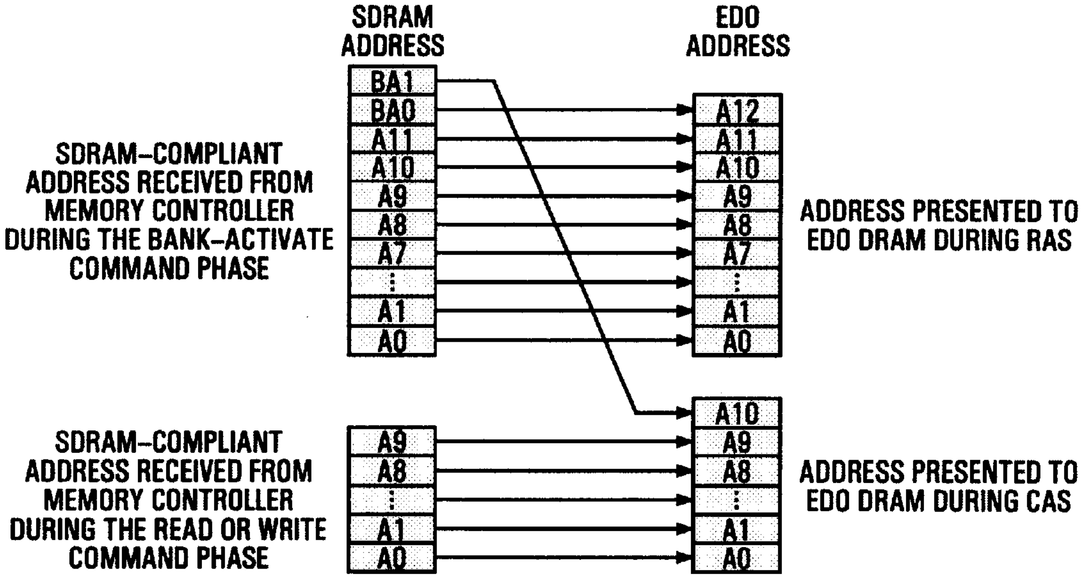
FIG. 6 is a schematic diagram showing a bit mapping of an address translation during assertion of a RAS strobe and during assertion of a CAS strobe, according to the present invention.

FIG. 6 shows a symbolic representation of an address translation between a 64-megabit SDRAM and a 64-megabit EDO DRAM. Because the EDO DRAM, unlike the SDRAM, does not have separate internal banks, address translation must take into account of this difference when translating the address from a SDRAM-compliant protocol to a EDO DRAM-compliant protocol by mapping the bank-select signals into one or more column or row addresses of the EDO DRAM. The purpose of FIG. 6 is to illustrate the mechanism behind the address translation. The left side of FIG. 6 shows the SDRAM-compliant address such as would be seen at the front end 302 of the RPM 300. The right side of FIG. 6 shows the EDO-compliant address that would be driven out to a physical EDO device at the back end 306. The top half of the left side of FIG. 6 shows the SDRAM-compliant address as well as bank select signals (BA1 and BA0) during the Bank Activate Command Phase of the SDRAM cycle. During this phase, the address represents the row-address of a SDRAM device while the bank-select signals (BA1 and BA0) selects one of the internal banks of the SDRAM. The lower half of the left side of FIG. 6 shows the SDRAM-compliant address during the Read and Write Command Phase of a SDRAM cycle. During this phase, the address represents the column address of the SDRAM. For this example we are assuming a translation from a SDRAM-compliant address of a 64 Mbit SDRAM device organized as a 4K Rows by 1K Columns by 4-bit by 4 internal banks device to a EDO-compliant address of a 64 Mbit EDO DRAM organized as a 8K Rows by 2K Columns by 4-bit device. Thus during the Bank Activate Command Phase, 12 address bits (A11 to A0) are required to address the 4K rows of the SDRAM while during the Read/Write Command Phase, 10 address bits (A9 to A0) are required to address the 1K columns of the SDRAM. However, the 64 Mbit EDO DRAM requires 13 address bits (A12 to A0) to address the 8K rows of the EDO DRAM and 11 address bits (A10 to A0) to address the 2K columns of the EDO DRAM device. Thus one possible translation scheme is to map the 12 row address bits (A11 to A0) of the SDRAM-compliant address during the Bank-Activate Command Phase directly to the 12 row address bits (A11 to A0) of EDO DRAM at the back end 306 during the row-address time of the EDO (qualified by assertion of RAS). Also in this scheme, Bank Select bit BA0 of the SDRAM-compliant address during Bank Active Command Phase is mapped to row address bit A12 of the EDO during row-address time of the EDO at the back end 306. Bank-select bit BA1 will be latched internally in the RPM and later combined with the 10 SDRAM-compliant column address bits (A9 to A0) during Read/Write Command Phase and mapped to EDO-compliant column address bits (A10 to A0) during the column-address time of the EDO (qualified by assertion of CAS). During column address mapping, the previously latched BA1 is mapped to EDO-compliant column address bit A10 while SDRAM-compliant column address bits (A9 to A0) is mapped to EDO-compliant column address bits (A9 to A0).

This highlights one of the significant advantages of the present invention. Optimal performance is not the objective; re-use of previously purchased memory components with a partial upgrade is what is desired, even if these memory components are inferior to others that are available. As new memory modules become available, for example, if a faster SDRAM memory module 240 is available, the slower SDRAM memory module 320 can simply be moved to a memory personality module 300, thus the older, slower memory modules need not be replaced in order to take advantage of the greater speed of the SDRAM memory module 240. Thus, multiple speed SDRAMs are configurable within the same system. Although this configuration is perhaps suboptimal, given the availability of the higher speed SDRAM memory module 240, when a significant investment has already been made in the previous purchase of the slower EDO memory module 320, the configuration shown in FIG. 3 is suitable for use as an intermediate upgrade step, eliminating the abrupt expense otherwise necessitated by each incremental advance in SDRAM speeds.

Regardless of the memory type, the RPM 300 is capable of making the memory module 320 connected to the back end 306 thereof appear as a standard SDRAM memory module 340 to the memory controller 200. Thus, no changes are needed to the memory controller 200.

The EDO DRAM, being a much slower device than the SDRAM, could not keep up with back-to-back cycles at the same rate as the SDRAM. This is partly due to the presence of internal banks within the SDRAM device, allowing the non-active banks to precharge while the active bank is being accessed. EDO devices, having no internal banks, require more time to precharge after the previous memory cycle is completed and before the next memory cycle can begin. When the memory controller is interfaced on bus 210 to SDRAM DIMMs, it can drive faster back-to-back cycles to fully capitalize on the SDRAM DIMMs' capabilities. When the memory controller 200 is interfaced to a RPM with EDO DIMMs it must reduce the rate of back to back cycles as well as increase the latency between adjacent memory cycles by inserting dummy or idle states where necessary. Therefore, during system initialization, the memory controller 200 must determine whether it is interfaced via bus 210 directly to SDRAM DIMMs or via bus 210 to a RPM with EDO DIMMs connected to the RPM's backend 306. Certain pins on the memory controller 200 can be designated as power-up configuration pins to allow the memory controller to detect the type of device connected to memory bus 210. The system hardware designer will connect these pins to a known logic level by the use of pull-up or pull-down resistors or connect these pins to the RPM power-up configuration bus 309. During system initialization, the memory controller 200 reads the status of RPM power-up configuration bus 309 to determine the type of device connected to bus 210 (that is, whether the device is an array of SDRAM DIMMs or a RPM with EDO DIMMs). If a RPM is detected on bus 210 the memory controller can further read the type of memory modules connected to the backend 306 of the RPM and the density, speed and other characteristics of the mentioned memory modules via the SPD bus 360. The RPM power-up configuration bus on the memory controller 200 can also indicate whether the RPM has EDO DIMMs or other types of memory modules (such as SLDRAM, etc.) connected to its back end 306.

The present invention allows heterogeneous memory types within the same memory array. Moreover, the present invention is capable of determining the memory type of each DIMM or SIMM in the memory array, and providing memory-addressing compatible thereto.

Different memory modules connected to the back end 306 have different size and organization, and the memory personality module 300 provides the appropriate address translation at the appropriate address cycle. Address translation between memory address on address bus 352 and memory address on address bus 362, within the memory personality module 300, depends on the protocol for which the memory controller 200 is designed, as well as the memory module type of the memory module connected to the back end 306. The memory controller 200 is typically designed for standard SDRAM devices 240 and uses a standard SDRAM protocol. The memory module type of device 320, however, is read from the memory module 320 itself on the SPD or PPD bus 360, if available, or from the parallel to serial presence detect logic. Therefore the corresponding bus protocol must be flexible and dynamically adjustable. The address translation hardware or firmware within the RPM 300 remaps the address according to the device type of memory module 320. The memory module type is read from the presence detect value 550 (described in greater detail with reference to Table 1) read from the memory module 320 itself. The internal hardware or firmware of the middle portion 304 of the RPM 300 performs memory address translation between the front end 302 and the back end 306; i.e., between a standard SDRAM protocol compatible with memory bus 210, (and also with memory module 240 and memory controller 200) and a device type protocol compatible with device 320 and memory bus 310. As stated previously, the memory module 320 may have one, two, or four physical memory modules therewithin.

It will be recognized that the mapping illustrated in FIG. 6 is specific to one physical structure of a logical EDO-DRAM memory module 320. If two or four physical EDO DIMMs replace the single EDO-DRAM coupled to the back end of the RAM personality module 300 shown in FIG. 6, then the mapping within the memory personality module 300 will be significantly different.

Figure 7:
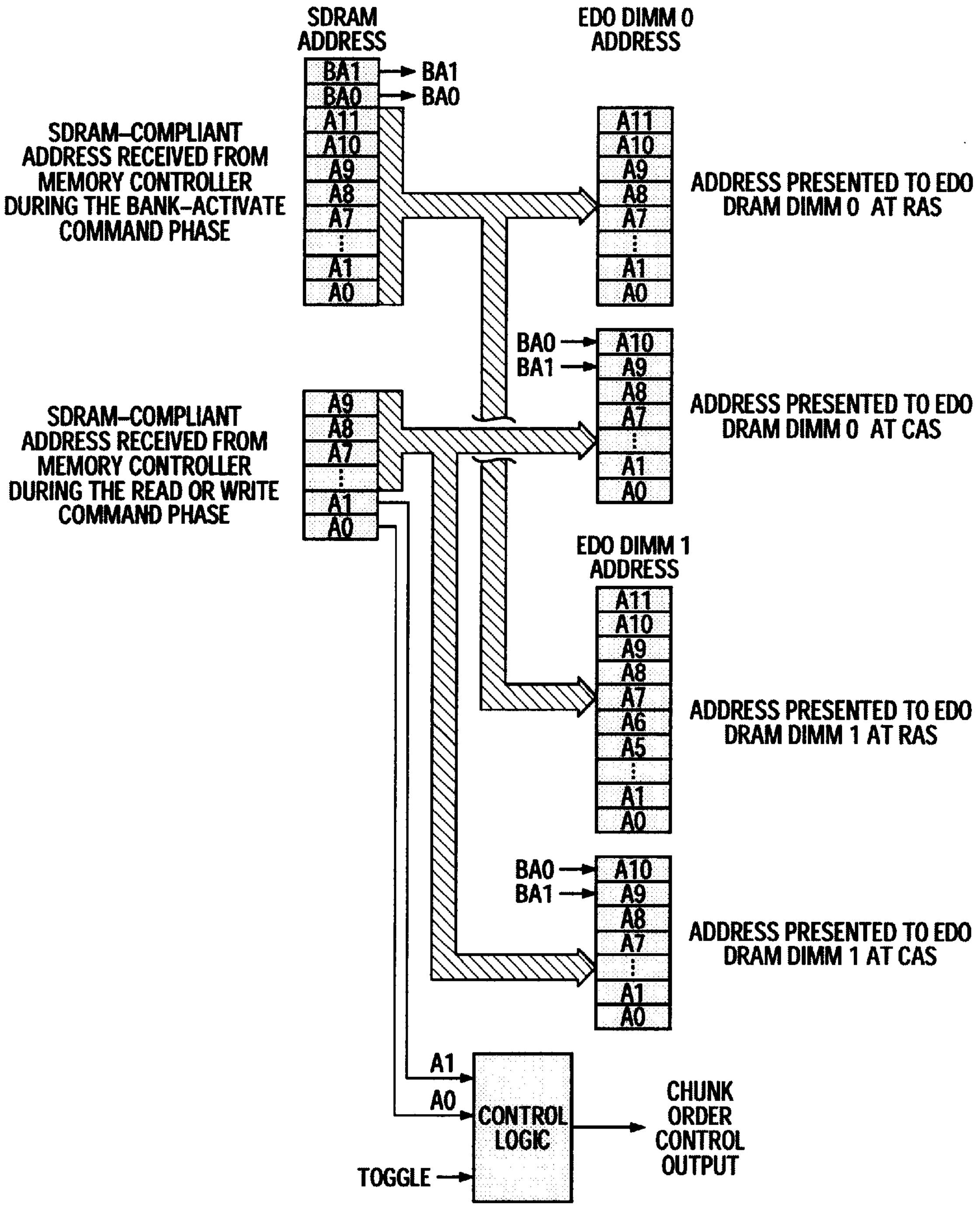
FIG. 7 is a schematic diagram of an address translation during a RAS strobe and subsequently during a CAS strobe, when two physical memory modules are used, according to the invention.

FIG. 7 shows an example of address translation for two physical 64MB (8M×72) signal-row EDO DIMMs connected to the back end 306 of the RPM 300. The address translation will make the front end 302 of the RPM 300 appear as a single 128 MB (16M×72) single-row SDRAM DIMM on the memory bus 210 to the memory controller 200. The two physical EDO DIMMs are identified as EDO DIMM0 and EDO DIMM1.

Referring to FIG. 7, the front end 302 of the memory personality module 300 is coupled to two bank select signals (BA1 and BA0) and a 12-bit address bus 352, having bits A1 through A0. Often, the bank select signals are part of the address signals or are an extension of address signals and may be regarded in this example as SDRAM address bits A13 and A12. The back end 306 of the memory personality module 300 has 12 bits of memory address on memory address bus 362, including bits A11 through A0, corresponding to the physical device the user has connected (e.g. two 64 MB single-row EDO DIMMs). During the bank activate command, the 12 bits of memory address (A11 through A0) on address bus 352 at the front end 302 are mapped directly to the 12 bits of memory address (A11 through A0) on memory address bus 362 at the back end 306. The memory address (A11 through A0) on bus 362 are driven out as row address during assertion of RAS strobe by the RPM to each of the two physical EDO DIMMs. The two bits of the bank select signals (BA1 and BA0) are latched during the bank activate command for later assertion during the read/write command phase.

Subsequently, during the read/write command phase of the SRAM compliant protocol, the values of bank select signals (BA1 and BA0) which are latched earlier during the bank activate command phase are provided as memory column address bits A9 and A10, respectively, on memory address bus 362 of the back end 306. Moreover, the address bits A9 through A1 latched from address bus 352 at the front end 302 during the Read or Write Command phase of the SDRAM protocol are mapped to memory address bits A8 through A0 on address bus 362 at the back end 306. The memory address bits (A8 through A0) on bus 362 are driven out as column address when the RPM asserts CAS strobe to each of the two physical EDO DIMMs. Address bits A1 and A0, latched from bus 352 at the front end 302 during the Read or Write Command phase of the SDRAM protocol, are also used as chunk order control bits within the memory personality module 300. The chunk order logic in the RPM is used to determine the order in which a 8-byte wide chunk of data (within a 32-byte or 64-byte wide cache line) is transferred onto memory data bus 370 on bus 310 when data is accessed over the memory bus 310. Since each EDO DIMM in FIG. 7 is 64-bit-wide (or one-chunk wide) in terms of data-width, the chunk order logic will determine which physical EDO DIMM is accessed for each chunk of data transferred over the memory bus 310. Other mappings are selected when the memory personality module 300 detects a different presence detect value 550.

FIG. 7 shows address translation within a RPM 300 corresponding to a two-DIMM logical memory module 320.

As shown in FIG. 7, the front end 302 is compatible with a (16M×72) 128 MB single-row SDRAM DIMM, and the back end 306 is compatible with a logical DIMM having two (8M×72) 64 MB single-row EDO DIMMS. Presence Detect Value 550 is Dh (see Table 2, column 608).

Memory address translation within a memory personality module for a four-DIMM memory module is not shown, but can be understood by reference to the tables in Tables 4, 5, and 6. When the memory module 320 has two or four physical memory modules therewithin, the address translation is somewhat more complex than when only one physical memory module is used.

Referring now to Tables 4, 5, and 6, the internal bit mapping within the memory personality module 300, implementing some of the translations in Table 2 and Table 3, are shown in greater detail. The first column 572 shows possible SDRAM DIMM sizes used on bus 210. The front end 302 is coupled to memory bus 210 using a protocol according to column 572. The protocol according to column 572 is compatible with memory bus 210, memory module 240, and memory controller 200. The second column of Tables 4, 5, and 6, i.e., column 690, shows the bit mapping within the memory personality module 300 when the back end 306 is coupled to a logical DIMM consisting of two physical EDO DIMMs.

The address translation scheme 690' is used when a logical memory module 320 contains two physical EDO DIMMs. The use of the memory personality module 300 allows translation between the protocol defined in column 572 and a second protocol compatible with a memory module 320 connected to the back end 306 of the memory personality module. The back end 306 of the memory personality module 300 may be connected to a single DIMM, a pair of physical DIMMs implemented as a single logical DIMM as shown in FIG. 7, or as four physical DIMMs configured as a single logical DIMM.

The third column of the table shown in Tables 4, 5 and 6, i.e., column 692, shows an address translation scheme 692 when a logical memory module 320 contains four physical EDO SRAM DIMMs. The translation scheme maps a logical memory module 320, consisting of four physical EDO DIMMs, to a memory bus 210 requiring a protocol according to the column 572.

Address translation for multiple physical memory modules within a logical memory is further illustrated by way of an example. As shown in the first row of Tables 4, two 8-megabyte EDO DIMMs may be used at the back end 306 of the memory personality module 300, having 12 bits of row address and 8 bits of column address, as shown in column 690'. The front end 302 is connected to memory bus 210 requiring 11 bits of row address, 9 bits of column address, and one bank select bit BA0. During the bank activate command phase, the lower eleven bits of memory address on address bus 352 of the front end 302 are directly mapped to the lower eleven bits of memory address on memory address bus 362 at the back end 306. Also, the bank select bit BA0 at the front end 302 is mapped to the bit RA11 of memory address on memory address bus 362 at the back end 306. Subsequently, during the read or write command phase, the address bits A8 to A1 on address bus 352 at the front end 302 are mapped to the address bits A7 to A0 on memory address bus 362 at the back end 306, while address bits A1 and A0 are mapped as inputs to a chunk order control circuit to control the order in which the data chunks are to be bursted to/from memory.

TABLE 4

| 572<br>SDRAM DIMM SIZE | 690<br>2-TO-1 EDO TO SDRAM DIMM SUBSTITUTION | 692<br>4-TO-1 EDO TO SDRAM DIMM SUBSTITUTION |
|---|---|---|
| 16M (S) SDRAM<br>DIMM<br>(11/9) Addressing; 2 Internal Banks)<br>ACT: BA0, AA<10:0><br>CMD: CMA<8:0> | TWO 8MB (S) EDO DIMMs (PD = 6)<br>(12/8 Addressing)<br>RAS: AA<10:0> → RA<10:0><br>BA0 → RA11<br>CAS: CMA<8:1> → CA<7:0><br>CHUNK ORDER CTRL: CMA 1,0<br>OR<br>TWO 8MB (S) EDO DIMMs (PD = 4)<br>(10/10 Addressing)<br>RAS: AA<9:0> → RA<9:0)<br>CAS: BA0 → CA9<br>AA10 → CA8<br>CMA<8:1> → CA<7:0><br>CHUNK ORDER CTRL: CMA 1,0 | USING FOUR 8MB (D) EDO DIMMs<br>To substitute two 16MB (S) SDRAM<br>DIMM<br>(PD = 3) (10/9 Addressing)<br>RAS: AA <9:0> → RA <9:0><br>CAS: BA0 → CA8<br>AA10 → CA7<br>CMA<8:2> → CA<6:0><br>CHUNK ORDER CTRL: CMA 1,0 |
| 32M (S) SDRAM<br>DIMM<br>(11/10 Addressing; 2 Internal Banks)<br>ACT: BA0, AA,10:0><br>CMD: CMA,9:0> | TWO 16MB (5) EDO DIMMs (PD = 9)<br>(11/10 Addressing)<br>RAS: AA<10:0>→ RA<10:0><br>CAS: BA0 → CAS<br>CMA <9:1> → CA <8:0><br>CHUNK ORDER CTRL: CMA 1,0 | FOUR 8MB (S) EDO DIMMs (PD = 6)<br>12/8 Addressing)<br>RAS: AA<10:0> → RA<10:0><br>RAO → RA11<br>CAS: CMA<9:2> → CA<7:0><br>CHUNK ORDER CTRL: CMA 1,0<br>OR<br>FOUR 8MB (5) EDO DIMMs (PD = 4)<br>(10/10 Addressing)<br>RAS: AA<9:0> → RA<9:0><br>CAS: BA0 → CA9<br>AA10 → CA8<br>CMA<9:2> → CA<7:0><br>CHUNK ORDER CTRL: CMA 1,0 |

Legend:

BA<1:0>—Bank Select Bits input to SDRAM during Bank Activate Command

AA<xx:x>—Row Address Bits driven to SDRAM duiing Bank Activate Command

CMA<xx:x>—Column Address Bits driven to SDRAM during Read/Write Command

RA<xx:x>—Row Address Bits driven to EDO during RAS assertion

CA<xx:x>—Column Address Bits driven to EDO during CAS assertion

TABLE 5

| 572<br>SDRAM DIMM SIZE | 690<br>2-TO-1 EDO TO SDRAM DIMM<br>SUBSTITUTION | 692<br>4-TO-1 EDO TO SDRAM DIMM<br>SUBSTITUTION |
|---|---|---|
| 64M (D) 8DRAM DIMM<br>(Treated as Two Separate 32MB<br>Single-Row SDRAM DIMMs with<br>11/10 Addressing & 2 Internal Banks)<br>ACT: BAO, AA<10:0><br>CMD: CMA<9:0> | 2 SETS OF TWO<br>16MB (S) EDO DTMMs<br>(PD-9)<br>(11/10 Addressing)<br>RAS: AA<10:0> → RA<10:0><br>CAS: BA0 → CA9<br>CMA<9:1> → CA<8:0><br>CHUNK ORDER CTRL: CMA1,0<br>OR<br>TWO 32MB (D)<br>EDO DIMMs (PD = A)<br>(11/10) Addressing)<br>RAS: AA<0:0> → RA<10:0><br>CAS: BA0 → CA9<br>CMA<9:1> → CA<8:0><br>CHUNK ORDER CTRL: CMA1,0 | 2 SETS OF FOUR<br>8MB (S) EDO DIMMs<br>(PD = 6)<br>(12/8 Addressing)<br>RAS: AA<10:0> → RA<10:0><br>BA0 → RA11<br>CAS: CMA<9:2> → CA<7:0><br>CHUNK ORDER CTRL: CMA1,0<br>OR<br>TWO SETS OF<br>FOUR 8MB (S) EDO<br>DIMMs (PD = 4)<br>RAS: AA<9:0> → RA<9:0><br>CAS: BA0 → CA9<br>AA10 → CA8<br>CMA<9:2> → CA<7:0><br>CHUNK ORDER CTRL: CMA1,0<br>OR<br>FOUR 16MB (D)<br>EDO DIMMs (PD = 8)<br>(12/8 Addressing)<br>RAS: AA<10:0> → RA<10:0><br>BA0 → RA11<br>CAS: CMA<9:2> → CA<7:0><br>CHUNK ORDER CTRL: CMA1,0<br>OR<br>FOUR 16MC (D)<br>EDO DIMMs (PD = 5)<br>(10/10/Addressing)<br>RAS: AA<9:0> → RA<9:0><br>CAS: BA0 → CA9<br>AA10 → CA8<br>CMA<9:2> → CA<7:0><br>CHUNK ORDER CTRL: CMA1,0 |
| 128M (S) SDRAM<br>DIMM<br>(12/10 Addressing; 4 Internal Banks<br>ACT: BA1,0 AA<11:0><br>CMD: CMA<9:0> | TWO 64MB (S) EDO<br>DIMMs (PD = D)<br>(12/11 Addressing)<br>RAS: AA<11:0> → RA<11:0><br>CAS: BA0 → CA10<br>BA1 → CA9<br>CMA<9:1> → CA<8:0><br>CHUNK ORDER CTRL: CMA1,0 | FOUR 32MB (S)<br>EDO DIMMs PD = B)<br>(12/10 Addressing)<br>RAS: AA<11:0> → RA<11:0><br>CAS: BA0 → CA9<br>BA1 → CA8<br>CMA<9:2> → CA<7:0><br>CHUNK ORDER CTRL: CMA1,0 |

TABLE 6

| 572<br>SDRAM DIMM SIZE | 690<br>2-TO-1 EDO TO SDRAM DIMM<br>SUBSTITUTION | 692<br>4-TO-1 EDO TO SDRAM DIMM<br>SUBSTITUTION |
|---|---|---|
| 256M (D) SDRAM<br>DIMM<br>(Treated as Two separate 128MB<br>Single-Row SDRAM DIMMs with<br>12/10 Addressing and 4 Internal Banks)<br>ACT: BA1,0 AA<11:0><br>CMD: DMA<9:0> | 2 SETS OF TWO<br>64MB (5) EDO DIMMs<br>(PD = D)<br>(12/11 Addressing)<br>RAS: AA<1:0> → RA<11:0><br>CAS: BA0 → CA10<br>BA1 → CA9<br>CMA<9:1> → CA<8:0><br>CHUNK ORDER CTRL: CMA1,0<br>OR<br>TWO 128MB (D)<br>EDO DIMMs (PD = E) | 2 SETS OF FOUR<br>32MB (5) EDO DIMMs<br>(PD = B)<br>(12/10 Addressing)<br>RAS: AA<11:0>→ RA<11:0><br>CAS: BA0 → CA9<br>BA1 → CA8<br>CMA<9:2> → CA<7:0><br>CHUNK ORDER CTRL: CMA1,0<br>OR<br>FOUR 64MB (D)<br>EDO DIMMs (PD = C) |

TABLE 6-continued

| 572<br>SDRAM DIMM SIZE | 690<br>2-TO-1 EDO TO SDRAM DIMM<br>SUBSTITUTION | 692<br>4-TO-1 EDO TO SDRAM DIMM<br>SUBSTITUTION |
|---|---|---|
| | (12/11 Addressing)<br>RAS: AA<11:0> → RA<11:0><br>CAS: BA0 → CA10<br>BA1 → CA9<br>CMA<9:1> → CA<8:0><br>CHUNK ORDER CTRL: CMA1,0 | (12/10 Addressing)<br>RAS: AA<11:0> → RA<l1:0><br>CAS: BA0 → CA9<br>BA1 → CAS<br>CMA<9:2> → CA<7:0><br>CHUNK ORDER CTRL: CMA1,0 |
| 512M (S) SDRAM<br>DIMM<br>(13/1 1 Addressing; 4 Internal Banks)<br>ACT: BA1,0 AA<12:0><br>CMD: CMA11, CMA<9:0> | TWO 256MB (5)<br>EDO DIMMs (PD = 2)<br>(Assuming 13/12 Addressing)<br>RAS: AA<2:0> → RA<12:0><br>CAS: BA0 → CA11<br>BA1 → CA10<br>CMA11 → CA9<br>CMA<9:1> → CA<8:0><br>CHUNK ORDER CTRL: CMA1,0 | FOUR 128MB (S)<br>EDO DIMMs (PD = F)<br>(13/11 Addressing)<br>RAS: AA<12:0> → RA<12:0><br>CAS: BA0 → CA10<br>BA1 → CA9<br>CMA11 → CA8<br>CMA<9:2> → CA<7:0><br>CHUNK ORDER CTRL: CMA1,0 |
| 1GB (D) SDRAM<br>DIMM<br>(Treated as Two Separate 512 MB<br>Single-Row SDRAM DIMMs with<br>13/11 Addressing and 4 Internal Banks)<br>ACT: BA1,0 AA<12:0><br>CMD: CMA11, CMA<9:0> | TWO SETS OF TWO<br>256MB (S) EDO DIMMs<br>(PD = 2)<br><br>Assuming 13/12 Addressing)<br>RAS: AA<12:0> → RA<12:0><br>CAS: BA0 → CA11<br>BA1 → CA10<br>CMA11 → CA9<br>CMA<9:1> → CA<8:0><br>CHUNK ORDER CTRL: CMA1,0 | TWO SETS OF<br>FOUR 128MB (S) EDO<br>DIMMs (PD = F)<br><br>(13/11 Addressing)<br>RAS: AA<12:0> → RA<12:0><br>CAS: BA0 → CA10<br>BA1 → CA9<br>CMA11 → CA8<br>CMA<9:2> → CA<7:0><br>CHUNK ORDER CTRL: CMA1,0<br>OR<br>FOUR 256MB (D)<br>EDO DIMMs (PD = 1)<br>(Assuming 13/11 Addressing<br>RAS: AA<12:0> → RA<12:0><br>CAS: BA0 → CA10<br>BA1 → CA9<br>CMA11 → CA8<br>CMA<9:2> → CA<7:0><br>CHUNK ORDER CTRL: CMA1,0 |

Table 7 and Table 8 show address translation schemes 690 and 692 in greater detail. Address translation schemes 690 and 692 correspond to logical memory modules 320 having two and four physical DIMMs, respectively. The first column, column 550 of Tables 7 and 8 shows a hexadecimal number representing the lower four bits of the EDO's parallel presence detect (PD) value for the given physical EDO memory module used. The organization of the physical memory module is also shown in Table 1, column 514.

For example, when the physical modules are 64 MB single-row EDO DIMM's (column 602, Table 2), the presence detect value is D (hexadecimal; column 608 of Table 2). As shown in Tables 6 and 7, when two such modules are used, translation to appear as a single 128 MB, single row SDRAM DIMM (see column 610, Table 2) proceeds according to translation scheme 690'. This particular example is further shown in FIG. 7.

TABLE 7

| PD<3:0> (HEX) | EDO DIMM SIZE | 2-TO-1 EDO-TO-SDRAM IMPLEMENTATION |
|---|---|---|
| 4 | 8M (S) | RAS: AA<9:0> → RA<9:0><br>CAS: BA0 → CA9<br>AA10 → CA8<br>CMA<8:1> → CA<7:0><br>CHUNK ORDER CTRL: CMA1,0 |
| 6 | 8M (S) | RAS: AA<10:0> → RA<10:0><br>CAS: BA0 → RA11<br>CMA<8:1> → CA<7:0><br>CHUNK ORDER CTRL: CMA1,0 |

TABLE 7-continued

| PD<3:0> (HEX) | EDO DIMM SIZE | 2-TO-1 EDO-TO-SDRAM IMPLEMENTATION |
|---|---|---|
| 5 | 16M (D) | NA |
| 8 | 16M (D) | NA |
| 9 | 16M (S) | RAS: AA<10:0> → RA<10:0><br>CAS: BA0 → CA9<br>CMA<9:1> → CA<8:0><br>CHUNK ORDER CTRL: CMA1,0 |
| A | 32M (D) | RAS: AA<10:0> → RA<10:0><br>CAS: BA0 → CA9<br>CMA<9:1> → CA<8:0><br>CHUNK ORDER CTRL: CMA1,0 |
| B | 32M (S) | NA |
| C | 64M (D) | NA |
| D | 64M (S) | RAS: AA<11:0> → RA<11:0><br>CAS: BA0 → CA10<br>BA1 → CA9<br>CMA<9:1> → CA<8:0><br>CHUNK ORDER CTRL: CMA1,0 |
| E | 128M (D) | RAS: AA<11:0>→ RA<11:0><br>CAS: BA0 → CA10<br>BA1 → CA9<br>CMA<9:1> → CA<8:0><br>CHUNK ORDER CTRL: CMA1,0 |
| F | 128M (S) | NA |
| 1 | 256M (D) | NA |

TABLE 7-continued

| PD<3:0> (HEX) | EDO DIMM SIZE | 2-TO-1 EDO-TO-SDRAM IMPLEMENTATION |
|---|---|---|
| 2 | 256M (S) | RAS: AA<12:0> → RA<12:0><br>CAS: BA0 → CA11<br>BA1 → CA10<br>CMA11 → CA9<br>CMA<9:1> → CA<8:0><br>CHUNK ORDER CTRL: CMA1,0 |
| 550 | 602 | 690 |

When physical modules are 8 MB single row EDO DIMMs (column 602, Table 2), the presence detect value can be 4 h or 6 h (see Table 2). As shown in Table 8, when four such modules are used, address translation to single 32 MB, single row SDRAM DIMM proceeds according to translation scheme mentioned in column 692 of Table 8.

TABLE 8

| PD<3:0> (HEX) | EDO DIMM SIZE | 4-TO-1 EDO-TO-SDRAM IMPLEMENTATION |
|---|---|---|
| 4 | 8M (S) | RAS: AA<9:0> → RA<9:0><br>CAS: BA0 → CA9<br>AA10 → CA8<br>CMA<9:2> → CA<7:0><br>CHUNK ORDER CTRL: CMA1,0 |
| 6 | 8M (S) | RAS: AA<10:0> → RA<10:0><br>BA0 → RA11<br>CAS: CMA<9:2> → CA<7:0><br>CHUNK ORDER CTRL: CMA1,0 |
| 5 | 16M (D) | RAS: AA<9:0> → RA<9:0><br>CAS: BA0 → CA9<br>AA10 → CA8<br>CMA<9:2> → CA<7:0><br>CHUNK ORDER CTRL: CMA1,0 |
| 8 | 16M (D) | RAS: AA<10:0> → RA<10:0><br>BA0 → RA11<br>CAS: CMA<9:2> → CA<7:0><br>CHUNK ORDER CTRL: CMA1,0 |
| 9 | 16M (S) | NA |
| A | 32M (D) | NA |
| B | 32M (S) | RAS: AA<11:0>→ RA<11:0><br>CAS: BA0 → CA9<br>BA1 → CA8<br>CMA<9:2> → CA<7:0><br>CHUNK ORDER CTRL: CMA1,0 |

TABLE 8-continued

| PD<3:0> (HEX) | EDO DIMM SIZE | 4-TO-1 EDO-TO-SDRAM IMPLEMENTATION |
|---|---|---|
| C | 64M (D) | RAS: AA<11:0> → RA<11:0><br>CAS: BA0 → CA9<br>BA1 → CA8<br>CMA<9:2> → CA<7:0><br>CHUNK ORDER CTRL: CMA1,0 |
| D | 64M (S) | NA |
| E | 128M (D) | NA |
| F | 128M (S) | RAS: AA<12:0> → RA<12:0><br>CAS: BA0 → CA10<br>BA1 → CA9<br>CMA11 → CA8<br>CMA<9:2> → CA<7:0><br>CHUNK ORDER CTRL: CMA1,0 |
| I | 256M (D) | RAS: AA<12:0> → RA<12:0><br>CAS: BA0 → CA10<br>BA1 → CA9<br>CMA11 → CA8<br>CMA<9:2> → CA<7:0><br>CHUNK ORDER CTRL: CMA1,0 |
| 2 | 256M (S) | NA |
| 550 | 602 | 692 |

Referring now to Table 9, an alternate mapping representation of Table 7 is shown. Table 9 shows the address translation 690 within the memory personality module 300 for converting the presence detect value 550 and address on address bus 352 to EDO address 362 when two physical EDO DIMMS are used. The memory personality module 300 may be configured as a logical network receiving a presence detect value 550 at the back end 306 and a plurality of memory address on address bus 352 at the front end 302, and providing memory address on memory address bus 362 at the back end 306. The presence detect value 550 is received from the memory module 320 connected to the back end 306, and indicates the EDO DIMM memory module size 510 and organization or configuration 514'. From this information, the number of row and column address bits can be determined. The memory personality module 300 also receives the SDRAM bank select bits from the front end 302. The memory personality module 300 also contains latches for storing the bank select bits and address bus 352.

TABLE 9

| | EDO ROW ADDRESS DURING RAS | | | | EDO COLUMN ADDRESS DURING CAS | | | | | |
|---|---|---|---|---|---|---|---|---|---|---|
| PD<3:0> | BIT 12 | BIT 11 | BIT 10 | BITS 9→0 | BIT 12 | BIT 11 | BIT 10 | BIT 9 | BIT 8 | BITS 7→0 |
| 0000 | x | x | x | xxxxxxxxxx | X | x | x | X | x | xxxxxxxxxx |
| 0001 | x | x | x | xxxxxxxxxx | X | x | x | X | x | xxxxxxxxxx |
| 0010 | AA12 | AA11 | AA10 | AA9→AA0 | X | BA0 | BA1 | CMA11 | CMA9 | CMA8→CMA1 |
| 0011 | x | x | x | xxxxxxxxxx | X | x | x | X | x | xxxxxxxxxx |
| 0100 | x | x | x | AA9→AA0 | X | x | x | BA0 | AA10 | CMA8→CMA1 |
| 0101 | x | x | x | xxxxxxxxxx | X | x | x | X | x | xxxxxxxxxx |
| 0110 | x | BA0 | AA10 | AA9→AA0 | X | x | x | X | x | CMA8→CMA1 |
| 0111 | x | x | x | xxxxxxxxxx | X | x | x | X | x | xxxxxxxxxx |
| 1000 | x | x | x | xxxxxxxxxx | X | x | x | X | x | xxxxxxxxxx |
| 1001 | x | x | AA10 | AA9→AA0 | X | x | x | BA0 | CMA9 | CMA8→CMA1 |
| 1010 | x | x | AA10 | AA9→AA0 | X | x | x | BA0 | CMA9 | CMA8→CMA1 |
| 1011 | x | x | x | xxxxxxxxxx | X | x | x | X | x | xxxxxxxxxx |
| 1100 | x | x | x | xxxxxxxxxx | X | x | x | X | x | xxxxxxxxxx |

TABLE 9-continued

| | EDO ROW ADDRESS DURING RAS | | | | EDO COLUMN ADDRESS DURING CAS | | | | | |
|---|---|---|---|---|---|---|---|---|---|---|
| PD<3:0> | BIT 12 | BIT 11 | BIT 10 | BITS 9→0 | BIT 12 | BIT 11 | BIT 10 | BIT 9 | BIT 8 | BITS 7→0 |
| 1101 | x | AA11 | AA10 | AA9→AA0 | X | x | BA0 | BA1 | CMA9 | CMA8→CMA1 |
| 1110 | x | AA11 | AA10 | AA9→AA0 | X | x | BA0 | BA1 | CMA9 | CMA8→CMA1 |
| 1111 | x | x | x | xxxxxxxxxx | X | x | x | X | x | xxxxxxxxxx |

Referring now to Table 10, an alternate mapping representation of Table 8 is shown. Table 10 shows the address translation scheme 692' for converting the presence detect value 550 and address bus 352 to EDO address 362 when four physical EDO DIMMs are used. Table 10 illustrates similar schemes for translating to a single logical memory module from four physical EDO DIMMs, each of the physical EDO DIMMs organized according to the presence detect value 550.

TABLE 10

| | EDO ROW ADDRESS DURING RAS | | | | EDO COLUMN ADDRESS DURING CAS | | | | | |
|---|---|---|---|---|---|---|---|---|---|---|
| PD<3:0> | BIT 12 | BIT 11 | BIT 10 | BITS 9→0 | BIT 12 | BIT 11 | BIT 10 | BIT 9 | BIT 8 | BITS 7→0 |
| 0000 | x | x | x | xxxxxxxxx | X | x | x | X | x | xxxxxxxxxx |
| 0001 | AA12 | AA11 | AA10 | AA9→AA0 | X | x | BA0 | BA1 | CMA11 | CMA9→CMA2 |
| 0010 | x | x | x | xxxxxxxxx | X | x | x | X | x | xxxxxxxxxx |
| 0011 | x | x | x | xxxxxxxxx | X | x | x | X | x | xxxxxxxxxx |
| 0100 | x | x | x | AA9→AA0 | X | x | X | BA0 | AA10 | CMA9→CMA2 |
| 0101 | x | x | x | AA9→AA0 | X | x | X | BA0 | AA10 | CMA9→CMA2 |
| 0110 | x | BA0 | AA10 | AA9→AA0 | X | x | x | X | x | CMA9→CMA2 |
| 0111 | x | x | x | xxxxxxxxx | X | x | x | X | x | xxxxxxxxxx |
| 1000 | x | BA0 | AA10 | AA9→AA0 | X | x | x | X | x | CMA9→CMA2 |
| 1001 | x | x | x | xxxxxxxxx | X | x | x | X | x | xxxxxxxxxx |
| 1010 | x | x | x | xxxxxxxxx | X | x | x | X | x | xxxxxxxxxx |
| 1011 | x | AA11 | AA10 | AA9→AA0 | X | x | x | BA0 | BA1 | CMA9→CMA2 |
| 1100 | x | AA11 | AA10 | AA9→AA0 | X | x | x | BA0 | BA1 | CMA9→CMA2 |
| 1101 | x | x | x | xxxxxxxxx | x | x | x | X | x | xxxxxxxxxx |
| 1110 | x | x | x | xxxxxxxxx | x | x | x | X | x | xxxxxxxxxx |
| 1111 | AA12 | AA11 | AA10 | AA9→AA0 | x | x | BA0 | BA1 | CMA11 | CMA9→CMA2 |

The Memory Personality Module Used in a Memory Subsystem

Figure 8:
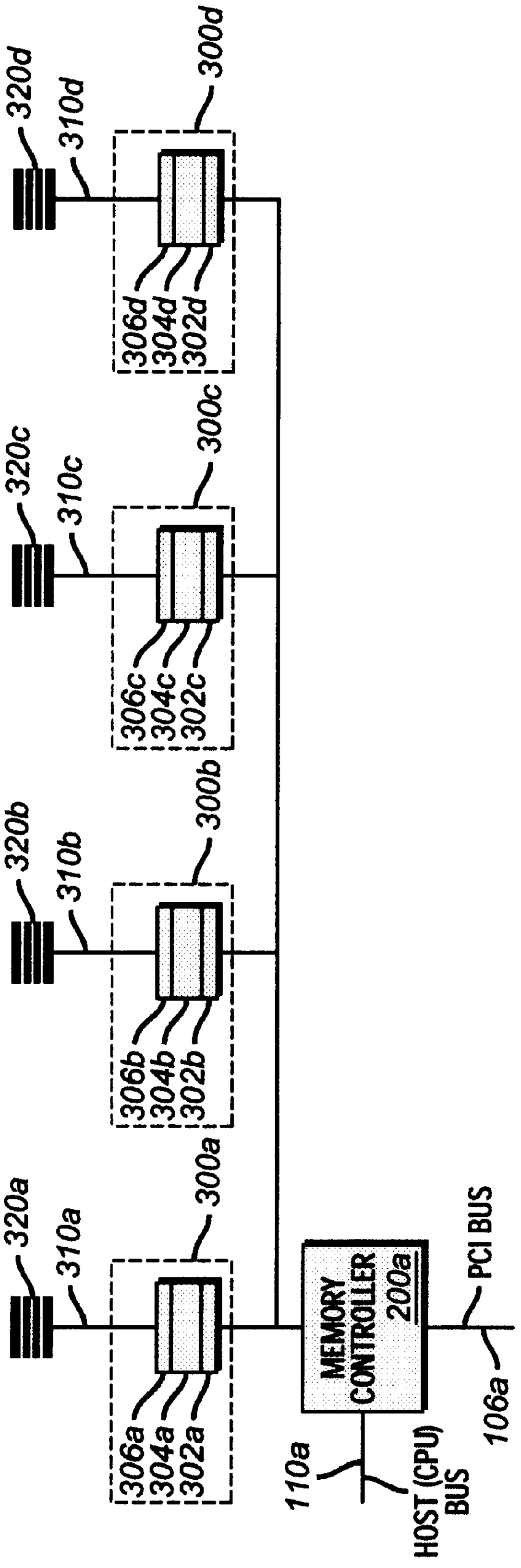
FIG. 8 is a schematic of a memory system, according to the present invention.
Figure 9:
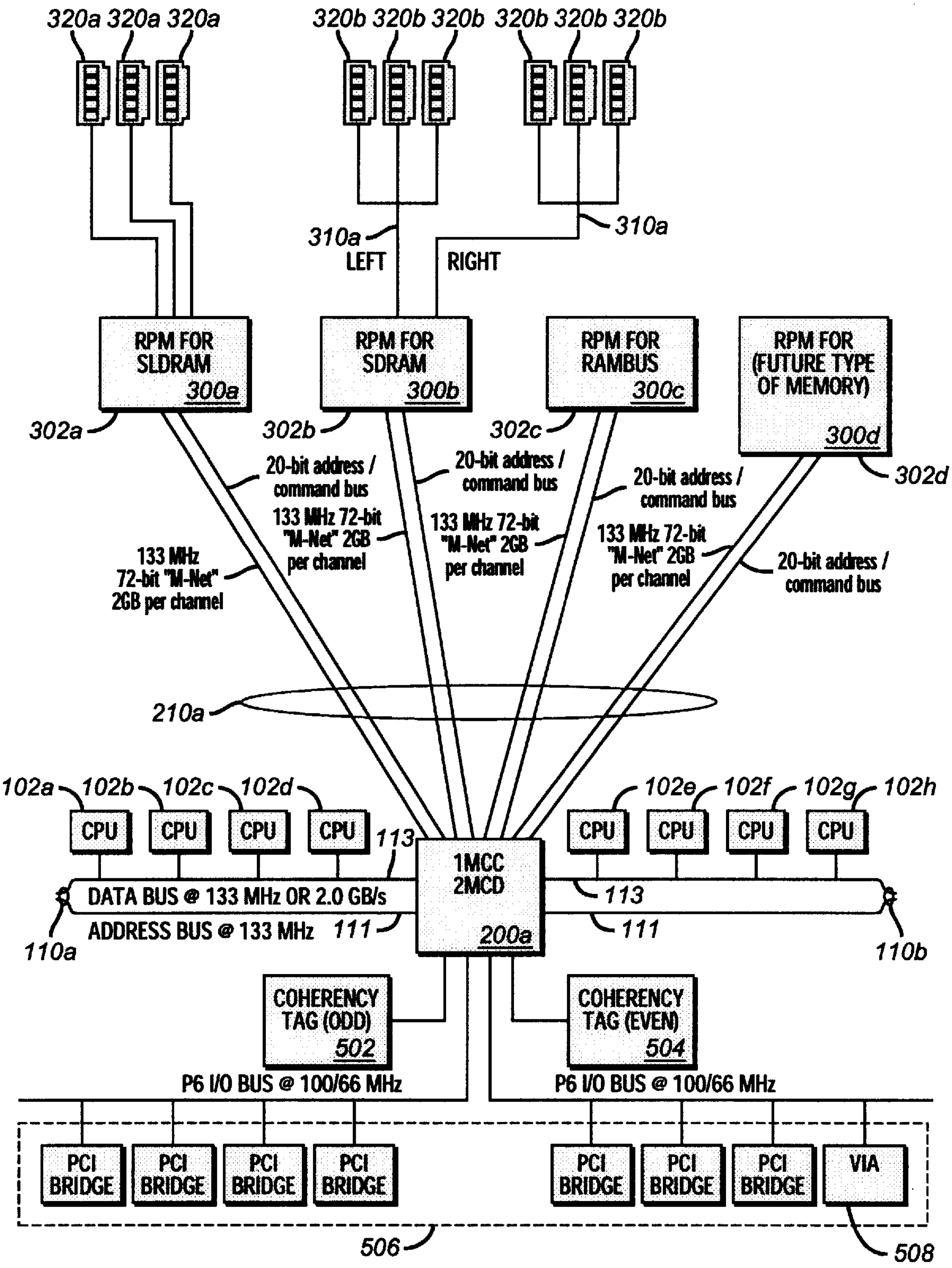
FIG. 9 is a schematic of the memory system of FIG. 8, illustrated in greater detail and having additional features.

Referring now to FIGS. 8 and 9, a memory system of the present invention having multiple memory personality modules structured as simplified memory controllers, is shown. A first (i.e., master) memory controller 200*a* is shown connected to a processor bus or host bus 110*a*. Moreover, a primary PCI bus 106*a* is coupled to the memory controller 200*a*. Each of the host buses 110*a* has an address bus 111 and a data bus 113 therewithin. The address and data buses are merely portions of each of the host bus 110*a*. The memory controller 200*a* operates as the previously described memory controller 200. However, whereas in FIG. 3 the memory controller 200 is connected to a memory personality module 300, the memory controller of FIG. 8 is connected to a plurality of remote memory controllers 300*a*–300*d*. The remote memory controllers 300*a*–300*d* replace the personality module 300 of previously described embodiments, and operate accordingly. The remote memory controllers 300*a*–300*d* may be connected either in parallel, each having a dedicated bus 210*a* to the host memory controller 200*a*, or may share a common bus 210*a* to the host memory controller 200*a*.

The remote memory controllers 300*a*–300*d* are streamlined versions of known memory controllers, but have been altered to include functionality of the memory personality module 300. Much of the functionality of a memory controller (e.g., interfacing with a PCI bus, decoding memory request indexes, etc.) are performed by the host memory controller 200*a*. Alternatively, the memory controllers 300*a* differ from known memory controllers only in that the remote memory controllers 300*a* are enabled by, and are commonly synchronized with the host memory controller 200*a*.

Furthermore, each of the plurality of remote memory controllers 300*a*–300*d* is coupled to a plurality of secondary buses 310*a*, connecting to one of a plurality of memory modules 320*a*. The memory module 320*a* may each be a complete memory module, or may include several smaller memory modules. However, if memory module 320*a* is composed of smaller memory modules, then the smaller memory modules are typically all identical. If memory module 320*a* includes memory modules of different types, then an additional RPM would be necessary, to interface between the memory controller 200*a* and the different type of memory modules.

Thus, as shown in FIGS. 8 and 9, host memory controller 200*a* and the plurality of remote memory controllers 300*a* form a heterogeneous memory structure. Each of the remote memory controllers 300*a* provides an interface between the connecting memory module 320*a* and the host memory controller 200*a*. Each of the remote memory controllers 300*a* has a back end 306*a* compatible with the connected memory module 320*a*, one of the plurality of memory modules 320*a–d*. Each of the remote memory controllers 300*a* has a front end 302*a* compatible with the host memory controller 200*a*. The host memory controller 200*a* is compatible with the processor bus (i.e., host bus 110*a* and host bus 110*b*).

Thus, the memory subsystem allows devices on the processor bus 110*a* or 110*b* to access memory modules 320*a*, despite disparity in type among the memory modules 320*a*. The memory controllers 300*a* provide the appropriate translation and address remapping as necessary to allow the memory access to proceed. By cascading multiple memory controllers in a tree-like network, heterogeneous memory types may be supported.

If desired, the present invention includes all personality modules and memory controllers in a single application specific integrated circuit (ASIC) interfacing between the host bus 110*a* or 110*b*, the DRAM bus 310*a*, and the PCI bus 106 (FIG. 8). The integrated circuit may contain the memory controller 200*a*; a CPU interface for coupling to host bus 110*a*, and to host bus 110*b* as well; various address queues and data queues for posting data for memory modules 320, thereby reducing the frequency of bus direction reversals; ECC logic having error correcting code for detecting and correcting memory errors; configuration logic for exchanging device resource requirements and assignments between PCI devices 506 on the PCI buses 106 and 106*a* and the processor 100 or peripheral interrupt controller 190 on the bus 106; a PCI arbiter (not shown) for handling resource conflicts and for processing interrupts among PCI devices 508; and a PCI interface for exchanging signals between the memory controller 200*a* and the PCI bus 106 or 106*a*. The CPU interface of the integrated circuit includes a processor address interface and a processor data interface, each of which is coupled to at least one processor, e.g. central processing unit 100.

If desired, the processor address portion of the host bus 110*a* is coupled to a number of processors, and receives indexed addresses corresponding to memory access requests. Similarly, the processor data portion of host bus 110*a* is coupled to the same processors, for receiving data corresponding to the indexed memory requests. Thus, on a read request, a processor provides address information to the processor address bus 111 within host bus 110*a*, including the header having an index identifying the processor request. Before providing the index, the processor ensures that the index will be unique among pending access requests on the address bus 111. On a write request, the processor similarly provides address and header information, including the index, to the processor address bus 111, and also provides data to the processor data bus 113.

On a read access, the processor thereafter either continuously or periodically scans the processor address bus 111 and processor data bus 113 to determine whether data corresponding to a read access by the particular processor has been returned and is now pending on the data bus 113. If a response having data and also having an index recognizable by the processor as corresponding to a memory access request previously by the processor, then the processor reads the data from the data bus and clears the index, incidentally freeing the index for reuse on a subsequent memory access.

The memory controller 200*a* of the integrated circuit is coupled via a memory address bus and a memory data bus within memory buses 210*a* to a number of remote memory controllers. The remote memory controllers may be connected point-to-point or shared the same memory bus. The memory components may be configured as SIMM or DIMM modules.

As stated above, the memory controller of the integrated circuit may be a tiered system according to the present invention, including a first memory controller or first tier of the memory controller system, and at least one secondary tier or second memory controller component. Each of the memory controller components is coupled, in most embodiments, to a discrete set of memory components via a separate memory address and memory data bus. In some embodiments, however, some memory is connected directly to the first tier memory controller.

The first memory controller component (e.g., the memory controller 200 or 200*a*), or first tier, controls the individual cycle requests to the memory. In addition, it handles memory requests from processors and I/O devices, memory arbitration, and may also handle peripheral component interrupts. The first memory controller component may also configure the subsequent tier or tiers. The host memory controller, in some embodiments, also performs memory bus arbitration among multiple memory access from multiple sources. Because in some embodiments the memory controller can be coupled to a CPU bus or host bus and also to a peripheral component interconnect bus, arbitration is required when multiple sources seek to access the same memory channel or bus, or when the memory controller contains posting queues that are not necessarily coherent with main memory. Typically, memory requests from a processor have a higher priority than requests from other bus masters, except memory refresh requests, which are necessary for fundamental memory retention.

In some systems, processor requests of memory always take priority; in other embodiments, however, various bus masters rotate priority such that the oldest pending memory access request takes priority. Various other memory bus arbitration rules are also handled within the memory controller, and the memory interface.

Referring now to FIG. 9, a full implementation of the memory subsystem according to the present invention is shown. The memory system of FIG. 9 is more complex than the memory system of FIG. 3, but provides greater flexibility to the system designer. A memory controller 200*a* is coupled to one or more processor buses such as host bus 110*a*. Host bus 110*a* is coupled to a number of central processing units 102*a*–102*d*. Each of the central processing units 102*a*–102*d* provides memory access requests to the host bus 110*a*. Each of the memory access requests has, as a field thereof, an identifier that is unique among memory access requests pending on the host bus 110*a*.

The memory controller 200*a* receives and detects memory access requests pending on the host bus 110*a*. The memory controller 200*a* determines, with respect to each such pending memory access request, whether the memory access request is a read or write access. The memory controller 200*a* also determines the memory space or range for each RPM 300*a*–300*d*.

The format of the address bus 210*a* depends on the selection of memory controller 200*a*.

Each of the RPMs 300*a*–300*d* has at least one memory module 320*a*–320*d* connected thereto. However, the back end 306 of the RPM 300*a* is compatible with the memory modules 320*a*, and is not necessarily compatible with the back end of RPM 300*b*–300*d*. All the memory modules coupled to an RPM 300*a* are typically identical to one another.

For example, RPM 300*a* may be dedicated to SLDRAM. In such a case, each of the memory modules 320*a* comprises an SLDRAM DIMM, and the back end 306 of RPM 300*a* is compatible with SLDRAM protocol. The front end 302 of RPM 300*a*, however, remains compatible with the memory bus 210*a*. Likewise, RPM 300*b* may be configured to be compatible with SDRAMs. In such a case, the back end 306 of the RPM 300*b* is specifically designed to be compatible with SDRAM's protocol, and each of the memory modules 320*b* is SDRAM DIMM.

The memory controller 200*a* also provides a clock signal 358 to the RPMs, in order that communication and data transfer between the RPMs and the memory controller 200*a* occur synchronous over the memory bus 210*a*. The memory controller 200*a* also receives a serial presence detect (SPD) signal 360 from the RPM, during memory discovery, indicating to the memory controller the size, type, and other information pertaining to the memory modules 320*a*–320*d*.

Referring to FIG. 9, if the RPM 300*b* is capable of operation at multiple bus speeds simultaneously, memory modules 320*b* on the left 310*a* bus may operate at different speed than memory modules 320*b* on the right 310*a* bus. Although not shown as being connected to any specific memory modules, RPM 300*c* has a back end 306 specifically designed for compatibility with RAMBUS memory modules. Moreover, RPM 300*d* may be configured to have a back end 306 compatible with any new memory modules emerging on the market. The back end 306 of RPM 300*d* is compatible with the new memory modules connected thereto, while the front end 302 of the RPM 300*d* is compatible with the memory bus 210*a*.

The memory controller 200*a* initiates a memory request to one of the RPM 300*a*–300*d*, based on the predefined memory address mapping algorithm. On a memory read access, the target RPM decodes the identifier and provides the data to the memory controller 200*a*. The memory controller 200*a* routes the data to the appropriate host bus 110*a*, 110*b*, or I/O bus. The data is provided to the appropriate bus with overhead bits packed therewith, the overhead bits including the identifier. Once the data and identifier are on the appropriate bus for example, 110*a*, the processor connected to the bus 110*a* that initially provided the memory access request to the data bus detects the identifier and reads the data. On a memory write access, the write data destined for memory has been pre-posted in the write buffer of the memory controller 200*a* by one of the requesting devices. The requesting device can be a processor on the host bus 110*a* or 110*b* or an I/O device on one of the I/O buses. The memory controller 200*a* initiates a memory write request with data to the selected RPM.

The handshake signal of bus 210*a* is a data strobe signal indicating that data is valid. The memory controller, and also the RPM, is capable of storing memory access requests temporarily, so that memory accesses of the same type (either read or write) may be grouped without reversing the direction of the bus. This reduces the data bus latency due to the reversal of direction. The generic intra-memory interface bus 210*a* is typically a 72-bit bus, having 64 data bits and 8 bits of ECC or parity. Each RPM has a similar front end 302 and a similar generic central portion, but has a back end 306 compatible only with the memory module coupled directly thereto. When the memory module itself is slow, the RPM can perform data interleaving, so that data can be provided to the bus 210*a* at improved data rate. The data transfer rate (memory throughput) of the slow memory module such as EDO can be further improved with a wider back end 306.

The use of identifiers on the memory bus 210*a* makes these buses split task buses. The front end 302 of the RPM typically has a phase lock loop, to synchronize the front end 302 of the RPM to the clock. Synchronization with a clock allows the RPM to operate synchronously with the memory controller 200*a*. It will be recognized that the back end 306 of an RPM may be a generic memory interface.

To further aid understanding of the computer system and memory personality module of the present invention, a review of the SPD protocol and corresponding device types has been presented. The present invention's ability to determine the memory types present within the memory array enables the invention to alter the translation between the memory bus 210 and memory bus 310 when a different memory module 320 is used.

Reading the memory module type, or presence detect value 550, directly or indirectly (via parallel to serial conversion) from the memory module 320 upon accessing the memory module 320 allows tremendous flexibility in memory design. Different types of memory modules having different memory organizations may be connected to the same memory controller 200, provided memory modules incompatible with the memory controller protocol have an appropriate memory personality module performing necessary address translations.

State Machines

This section describes one possible state machine that performs the address and timing translation between the front end 302 which receives and provides signals as an SDRAM device and a back end 306 which receives and provides signals according to the memory module connected thereto. In this example the back end is connected to an EDO-type memory module. Also, in this example a 4-to-1 EDO-to-SDRAM interface is assumed which means using 4 physical EDO DIMMs connected to the back-end 306 to represent a single SDRAM DIMM as seen by the Memory Bus 210 connected to the front end 302.

The inputs to the state machine are the address 352, command 354, and clock 410 signals coming from the front-end 302. The outputs of the state machine will be the signals for driving the 4 physical EDO DIMMs connected to the back-end 306.

The purpose of the state machine is to make the 4 physical EDO DIMMs that are connected to the back end 306 to appear as a single SDRAM DIMM at the front end 302. The address and command signals at the front end will be SDRAM-compliant signals. The state machine in this example will show only the translation taking place for a typical SDRAM "Read with Auto-Precharge" cycle, a typical SDRAM "write with Auto-Precharge" cycle, and a typical CBR (CAS-BEFORE-RAS) refresh cycle.

Figure 11:
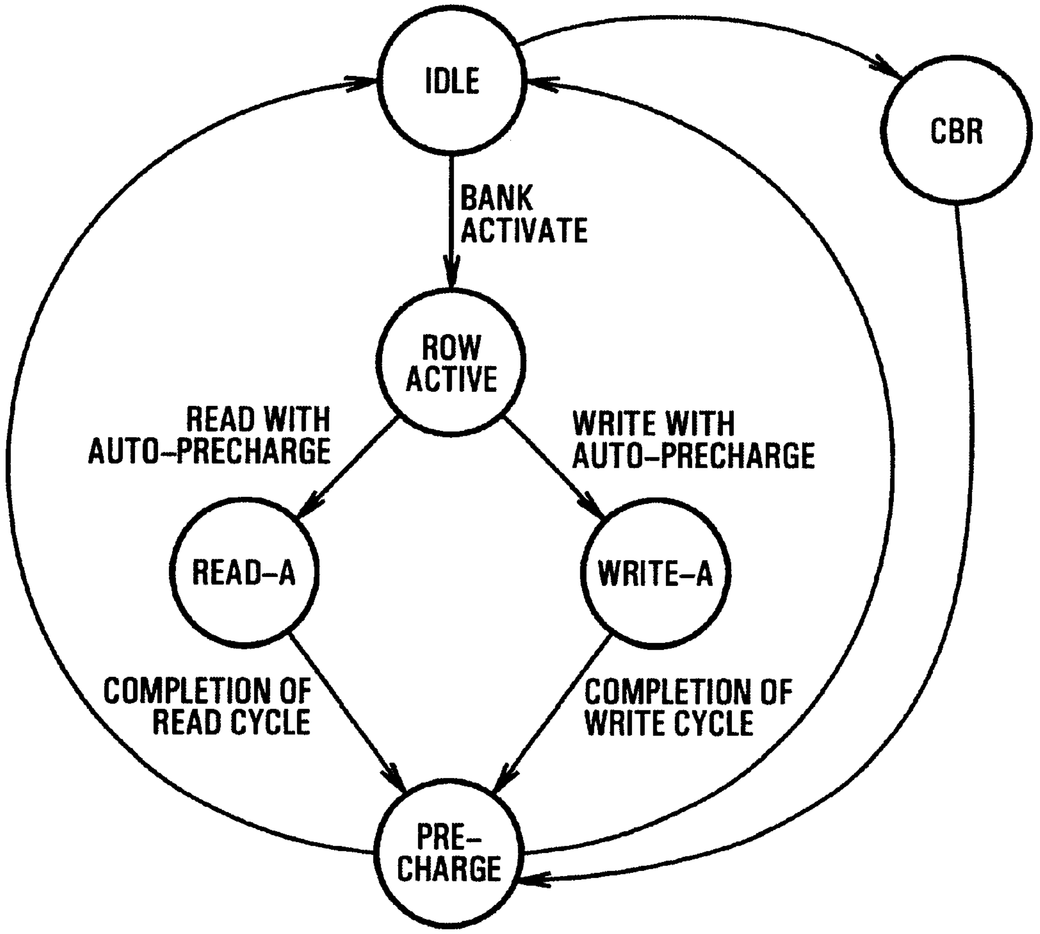
FIG. 11 is a state diagram of the performance of address and timing translation according to the present invention.

Note that it may be necessary for the clock that clocks the state machine to be at least 2 times the clock frequency of the input clock 410. Table 11 shows a simplified typical Command Truth Table for a SDRAM DIMM. FIG. 11 shows the State Diagram for the example state machine to be described below.

TABLE 11

| COMMAND | CS | RAS | CAS | WE | A10 |
|---|---|---|---|---|---|
| BANK ACTIVE | L | L | H | H | X |
| READ WITH AUTO PRECHARGE | L | H | L | H | H |
| WRITE WITH AUTO PRECHARGE | L | H | L | L | H |
| AUTO (CBR) REFRESH | L | L | L | H | X |

Referring to FIG. 11, the state machine begins in the IDLE state. When the input signals to the state machine represents a Bank-Activate command as depicted in the first row of Table 11, the state machine will latch the Address (and bank select) signals 352 and transition to the ROW-ACTIVE state. In the ROW-ACTIVE state, the row address 362 targeting the EDO device is being translated from front-end address 352 to back end address 362 according to the third column 692 of Tables 5 and 6. Also, the RAS 364 signal is driven to the EDO DIMM device connected to the back-end 306.

In the ROW-ACTIVE state, when the READ-WITH AUTO-PRECHARGE command is received as depicted by the second row of Table 11, the state machine transitions to the READ-A state. At the same time, the state machine will latch the address 352 signals which will later on be translated to column address 362 signals according to the third column 692 of Tables 5 and 6 and driven out to the EDO DIMM devices connected to the back end 306.

In the ROW-ACTIVE state, if a WIRE-WITH-AUTO-PRECHARGE command is received as depicted in the third row of Table 11, the state machine will transition to the WRITE-A state. At the same time, the state machine will latch the address signals 352 which will later on be translated to column address signals 362 and driven out to the EDO DIMM devices connected to the back end 306.

In the READ-A state after a number of clocks that meets certain timing requirements of the EDO DIMM device, the CAS signal 366 is driven to the EDO DIMM device connected to the back end 306. In the READ-A state the CAS signal 366 will be asserted for a specific number of clocks such as to meet the access time of the EDO DIMM device.

When the data from the EDO DIMM becomes valid after the access time of the EDO DIMM is met, the data 370 is latched by the state machine, 4-DIMMs-wide, meaning the data from the 4 physical EDO DIMMs is being latched in parallel in one clock. This data 370 is then clocked onto the front end 302 one chunk at a time in succession according to the chunk order that is controlled by the chunk-order control bits as depicted in the third column 692 of Tables 5 and 6. The state machine then de-asserts the RAS signals 364 and CAS signal 366 and transitions to the PRE-CHARGE state. After a predetermined number of clocks at the PRE-CHARGE state such as to satisfy the RAS precharge time of the EDO DIMM devices, the state machine returns to the IDLE state where it awaits the next BANK ACTIVE command.

In the WRITE-A state, the data supplied by the Memory Controller 200 via the bus 210 is being clocked by the clock signal 410 in 4 successive clock bursts. This data is being latched and assembled by the state machine. The state machine then asserts WE signal 368 and CAS signal 366 and drives the said assembled data in one clock to the 4 physical EDO DIMMs via the data bus 370. The state machine then de-asserts the RAS signal 364, the CAS signal 366, and the WE signal 368 and transitions to the PRE-CHARGE state. After a predetermined number of clocks at the PRE-CHARGE state such as to satisfy the RAS precharge time of the EDO DIMM devices, the state machine returns to the IDLE state where it awaits the next BANK ACTIVATE command.

In the IDLE state, when a CAS-BEFORE-RAS command is received as depicted by the fourth row of the Command Truth Table of the SDRAM, the state machine transitions to the CBR state. In the CBR state, the state machine asserts the CAS signal 366. After a specified number of clock periods such as to satisfy the CAS-setup-before-RAS timing of the EDO DIMM, the state machine asserts the RAS signal 364. Thence after a specified number of clock period such as to satisfy the CAS-hold-after-RAS timing of the EDO DIMM, the state machine de-asserts the CAS signal 366. Thence after a specified number of clock periods such as to meet the RAS-low-pulsewidth of the EDO DIMM the state machine de-asserts the RAS signal 364. The state machine then transitions to the PRE-CHARGE state. After a predetermined number of clocks at the PRE-CHARGE state such as to satisfy the RAS precharge time of the EDO DIMM devices, the state machine returns to the IDLE state where it awaits the next BANK ACTIVATE command.

It will be remembered that optimum performance is not necessary or desired. The present invention allows the owner of a large computer system to upgrade gradually rather than abruptly as new memory modules are introduced. By merely purchasing some of the new memory modules, and a RAM personality module having a back end appropriate to the new memory modules, a user may insert some of the new modules into an existing system without having to replace the entire memory array of the preexisting system. Thus, a more gradual upgrade is possible, and a user can purchase a system minimally sufficient to accomplish any predetermined set of needs without having to invest another enormous sum of money for a large high-speed system the user may be years away from needing.

The foregoing disclosure and description of the invention are illustrative and explanatory thereof, and various changes in number of variables, number of parameters, order of steps, field sizes, data types, code elements, code size, connections, components, and materials, as well as in the details of the illustrated hardware and software and construction and method of operation may be made without departing from the spirit of the invention.

We claim:

1. A method of supporting heterogeneous memory configurations in a computer system, the method comprising the steps of:

coupling a first memory module to a memory bus, the first memory module having a first memory access parameter set;

coupling a second memory module to a memory bus, the second memory module of a different type than the first memory module, the second memory module having a second memory access parameter set;

removably coupling a first translator module to the memory controller and to the first memory module;

removably coupling a second translator module to the memory controller and to the second memory module;

accessing the first memory module of a first memory type with the first memory access parameter set via the first translator module; and accessing the second memory module of a second memory type with the second memory access parameter set via the second translator module.

2. The method of claim 1, the step of accessing the first memory module the first memory access parameter set via the first translator module comprising the steps of:

translating a first memory access request from the memory controller by the first translator module, generating a first translated memory access request;

sending the first translated memory access request to the first memory module; and receiving a response from the first memory module to the first translated memory access request by the first translator module;

translating the response by the first translator module, generating a first translated response; and sending the first translated response from the first translator module to the memory controller.

3. The method of claim 1, the step of accessing the second memory module with the second memory access parameter set comprising the steps of:

translating a second memory access request from the memory controller by the second translator module, generating a second translated memory access request;

sending the second translated memory access request to the second memory module; and receiving a response from the second memory module to the second translated memory access request by the second translator module;

translating the response by the second translator module, generating a second translated response; and sending the second translated response from the second translator module to the memory controller.

4. The method of claim 1, wherein the first memory type is selected from a group consisting of direct-Rambus, SynchLink, SLDRAM, or double data rate (DDR) synchronous DRAM.

5. The method of claim 1, further comprising:

generating a serial presence detect signal to the memory controller; and identifying the type of the first memory module and the type of the second memory module using the serial presence detect input.

6. The method of claim 1, wherein only the first memory module has a fast page mode.

7. The method of claim 1, further comprising:

generating a phase lock loop;

synchronizing the first translator module to the memory controller with the phase lock loop; and synchronizing the second translator module to the memory controller with the phase lock loop.

* * * * *

UNITED STATES PATENT AND TRADEMARK OFFICE

CERTIFICATE OF CORRECTION

PATENT NO. : 6,530,007 B2

DATED : July 10, 2001

INVENTOR(S) : Sompong P. Olarig et al.

It is certified that error appears in the above-identified patent and that said Letters Patent is hereby corrected as shown below:

Column 40,
Line 66, after "module" insert -- with --.

Signed and Sealed this

Twenty-fourth Day of January, 2006

JON W. DUDAS

*Director of the United States Patent and Trademark Office*

UNITED STATES PATENT AND TRADEMARK OFFICE

CERTIFICATE OF CORRECTION

PATENT NO. : 6,530,007 B2
DATED : March 4, 2003
INVENTOR(S) : Sompong P. Olarig et al.

It is certified that error appears in the above-identified patent and that said Letters Patent is hereby corrected as shown below:

Column 40,
Line 66, after “module” insert -- with --.

This certificate supersedes Certificate of Correction issued January 24, 2006.

Signed and Sealed this

Fourteenth Day of March, 2006

JON W. DUDAS
*Director of the United States Patent and Trademark Office*